(12) United States Patent
Yukisada et al.

(10) Patent No.: US 9,561,708 B2
(45) Date of Patent: Feb. 7, 2017

(54) ROLL-SCREEN DEVICE

(71) Applicant: Webasto SE, Stockdorf (DE)

(72) Inventors: Shinya Yukisada, Higashi-Hiroshima (JP); Akio Yamada, Higashi-Hiroshima (JP)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/894,102

(22) PCT Filed: May 21, 2014

(86) PCT No.: PCT/EP2014/060466
§ 371 (c)(1),
(2) Date: Nov. 25, 2015

(87) PCT Pub. No.: WO2014/191283
PCT Pub. Date: Dec. 4, 2014

(65) Prior Publication Data
US 2016/0114664 A1    Apr. 28, 2016

(30) Foreign Application Priority Data
May 31, 2013 (JP) ................... 2013-115320

(51) Int. Cl.
*B60J 3/02* (2006.01)
*B60J 7/00* (2006.01)
*B60J 1/20* (2006.01)

(52) U.S. Cl.
CPC ............ *B60J 7/0015* (2013.01); *B60J 1/2052* (2013.01)

(58) Field of Classification Search
CPC ............... B60J 7/0015; B60J 1/2052
(Continued)

(56) References Cited

U.S. PATENT DOCUMENTS 1,882,982 A    10/1932    Schmiedeskamp
4,453,584 A *  6/1984    Steele ................. E06B 9/24
                                                 160/121.1
(Continued)

FOREIGN PATENT DOCUMENTS

DE    WO 2013149917 A1 * 10/2013 ............ B60J 7/0015
EP    2 447 098 A1    5/2012
JP    2012-091649 A   5/2012

OTHER PUBLICATIONS

PCT International Search Report dated Nov. 28, 2014 for International Application No. PCT/EP2014/060466 (4 pages).

*Primary Examiner* — Dennis H Pedder
(74) *Attorney, Agent, or Firm* — Fitch, Even, Tabin & Flannery, LLP

(57) ABSTRACT

When a light-shielding sheet enters guide rails, engagement belts of the light-shielding sheet engage with the guide rails. A roll-screen device includes a winding roller, a light-shielding sheet, guide rails, and guide sections. The light-shielding sheet includes a sheet body, and engagement belts provided along side edges at both sides of the sheet body in a vehicle width direction. The sheet body and the engagement belts are rolled up on the winding roller such that the sheet body and the engagement belts overlap each other. Each guide rail includes engagement wall section which is located at a vehicle widthwise inner side of the engagement belt and engages with the engagement belt to prevent the light-shielding sheet from falling out of the guide rail. The guide section includes a guide piece configured to put a distance between the engagement belt and the sheet body before the light-shielding sheet enters the guide rail.

6 Claims, 15 Drawing Sheets

(58) Field of Classification Search
USPC .......................................... 296/214, 216.08
See application file for complete search history.

(56) References Cited

U.S. PATENT DOCUMENTS

| | | | | |
|---|---|---|---|---|
| 4,649,981 | A * | 3/1987 | Bibeau | E06B 9/581 |
| | | | | 160/120 |
| 7,798,568 | B2 * | 9/2010 | Keller | B60J 7/0015 |
| | | | | 160/273.1 |
| 7,967,052 | B2 * | 6/2011 | Lin | B60J 7/0015 |
| | | | | 160/273.1 |
| 8,419,119 | B2 * | 4/2013 | Nakamura | B60J 7/0015 |
| | | | | 160/265 |
| 9,067,479 | B2 * | 6/2015 | Yukisada | B60J 7/0015 |

* cited by examiner

ROLL-SCREEN DEVICE

CROSS-REFERENCE TO RELATED APPLICATIONS

This application is a U.S. national phase application filed under 35 U.S.C. §371 of International Application PCT/EP2014/060466, filed May 21, 2014, designating the United States, which claims priority from Japanese Application JP 2013-115320, filed May 31, 2013, which are all hereby incorporated herein by reference in their entirety.

TECHNICAL FIELD

The technique disclosed herein relates to a roll-screen device configured to shield a window section formed in a roof of a vehicle from light.

BACKGROUND ART

Patent Document 1 discloses a roll-screen device configured to shield a window section of a roof panel from light. The roll-screen device includes a light-shielding sheet and a pair of guide rails configured to guide the light-shielding sheet. An engagement belt to be engaged with the guide rail is formed at part of the light-shielding sheet guided by the guide rail. Each engagement belt is formed in such a manner that the light-shielding sheet is folded back at a side edge thereof. The light-shielding sheet can be rolled up on a winding roller. A guide section configured to guide the light-shielding sheet drawn from the winding roller to the guide rail is provided at a rear end of the guide rail.

CITATION LIST

Patent Document

[Patent Document 1] Japanese Unexamined Patent Publication No. 2012-091649

SUMMARY OF THE INVENTION

Technical Problem

As in the foregoing configuration in which the engagement belt to be engaged with the guide rail is formed at the side edge part of the light-shielding sheet guided by the guide rail, when the light-shielding sheet drawn from the winding roller is guided to the guide rails, it is necessary not only to cause the side edge part of the light-shielding sheet to enter the guide rail, but also to cause the engagement belt to properly engage with the guide rail. That is, it is necessary that only each side edge part of a body of the light-shielding sheet is housed in a corresponding one of the guide rails and that the entirety of each engagement belt is housed in a corresponding one of the guide rails to engage with a wall section of the corresponding one of the guide rails. If the engagement belt cannot be properly engaged with the guide rail, the light-shielding sheet is easily fallen out of the guide rail.

The technique disclosed herein is intended to engage each engagement belt of a light-shielding sheet with a corresponding one of guide rails when the light-shielding sheet enters the guide rails.

Solution to the Problem

The technique disclosed herein is intended for a roll-screen device provided at a window section formed in a roof of a vehicle. The roll-screen device includes a winding roller; a light-shielding sheet configured to open the window section in a rolled-up state in which the light-shielding sheet is rolled up on the winding roller and to shield the window section from light in an unrolled state in which the light-shielding sheet is unrolled from the rolled-up state; guide rails provided on both sides of the light-shielding sheet in a vehicle width direction and configured to guide the light-shielding sheet when the light-shielding sheet transitions between the rolled-up state and unrolled state; and guide sections configured to allow entrance of side edges at both sides of the light-shielding sheet, which is drawn from the winding roller, in the vehicle width direction into the guide rails through entrance ports provided at end faces of the guide rails. The light-shielding sheet includes a sheet body, and engagement belts provided at and along side edges at both sides of the sheet body in the vehicle width direction. The sheet body and the engagement belts are rolled up on the winding roller such that the sheet body and the engagement belts lie on each other. The guide rails include engagement wall sections located at a vehicle widthwise inner side of the engagement belts and configured to engage with the engagement belts to prevent the light-shielding sheet from falling out of the guide rails. The guide sections include guide pieces each configured to put distance between the engagement belt and the sheet body before the light-shielding sheet enters the guide rails.

Advantages of the Invention

According to the roll-screen device, the guide piece puts distance between the engagement belt and the sheet body before the light-shielding sheet enters the guide rail. Thus, when the light-shielding sheet enters the guide rails, each engagement belt of the light-shielding sheet can be engaged with a corresponding one of the guide rails.

BRIEF DESCRIPTION OF THE INVENTION

FIGS. 13(A) and 13(B) are views illustrating the state in which the light-shielding sheet is about to engage with the guide pieces. FIG. 13(A) is a view of the light-shielding sheet and the guide piece from the above. FIG. 13(B) is a view of the light-shielding sheet and the guide piece from the below.

Figure 14:
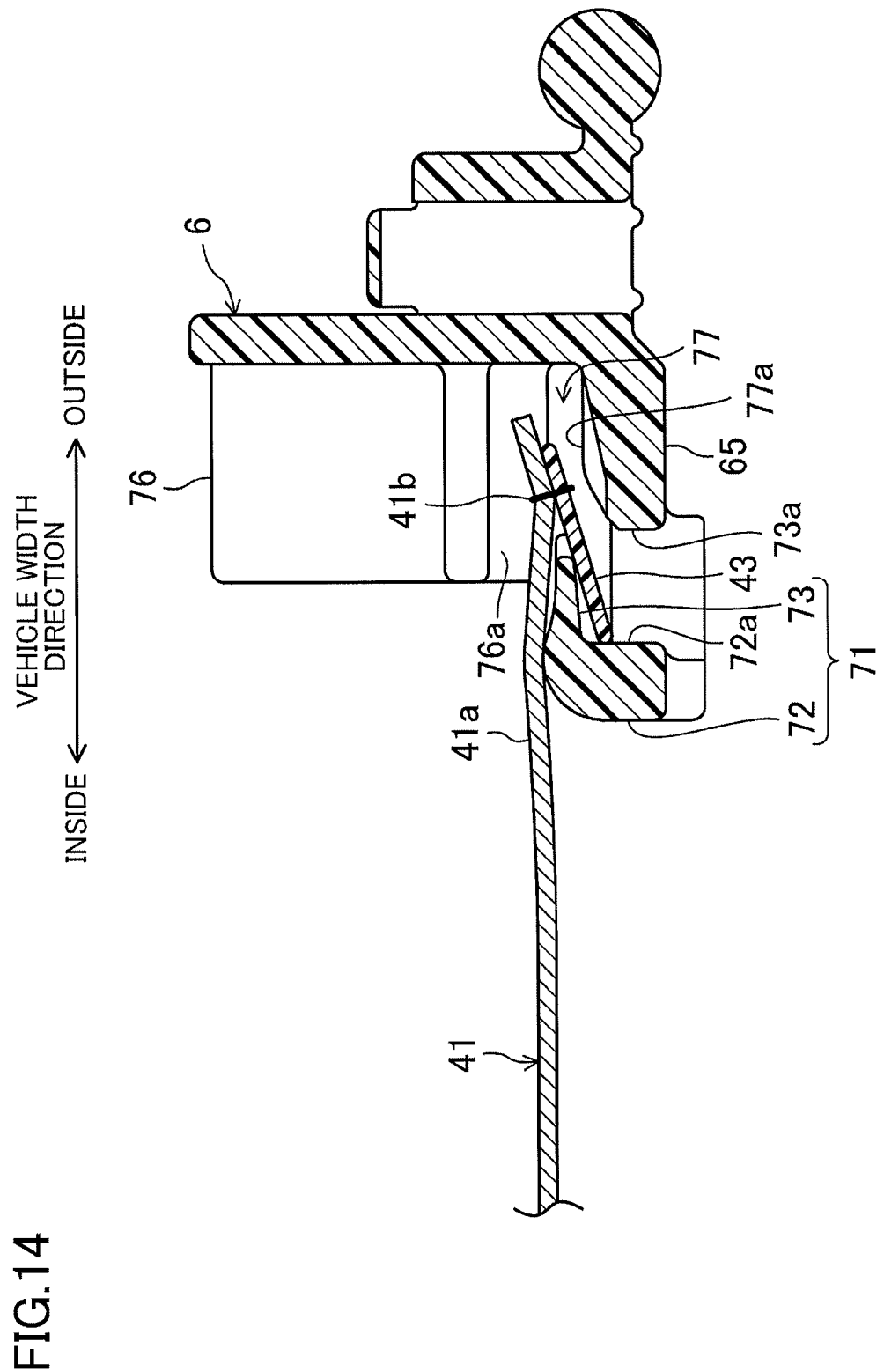

FIG. 14 is a cross-sectional view illustrating the state in which a separation wall is interposed between a sheet body and the engagement belt.

Figure 15:
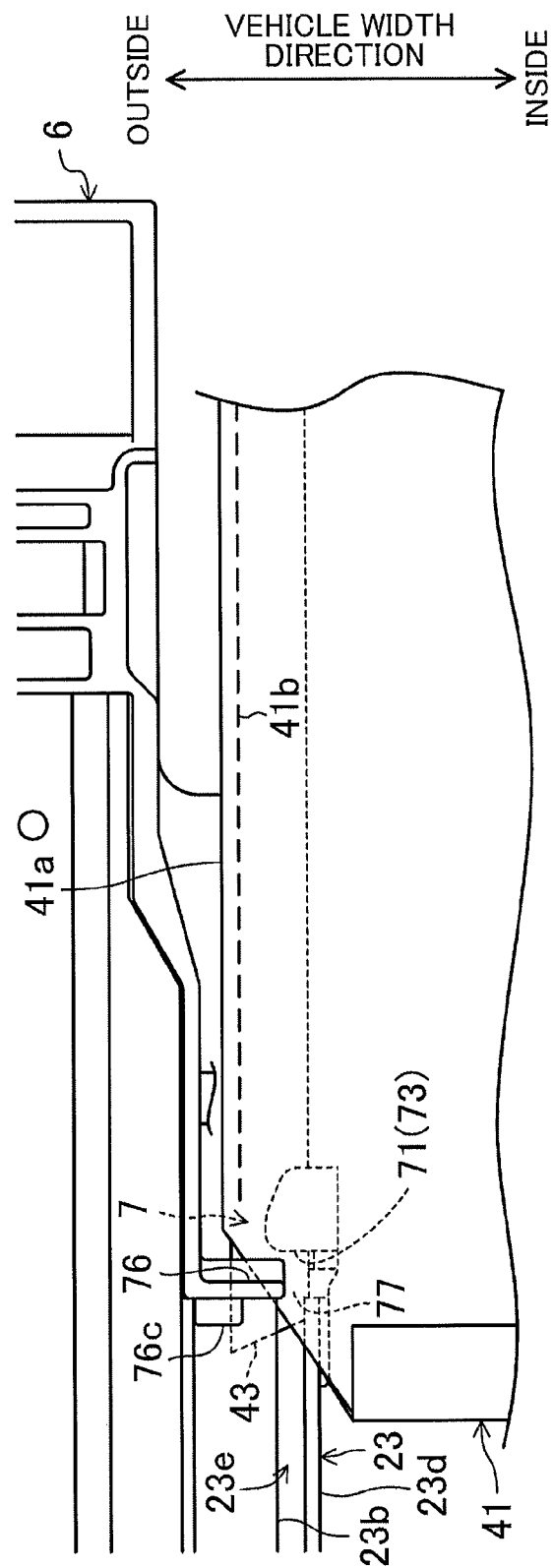

FIG. 15 is a view illustrating the state in which the light-shielding sheet have entered the sheet passage through the guide opening.

DESCRIPTION OF EMBODIMENTS

An example embodiment will be described in detail below with reference to drawings.

Figure 1:
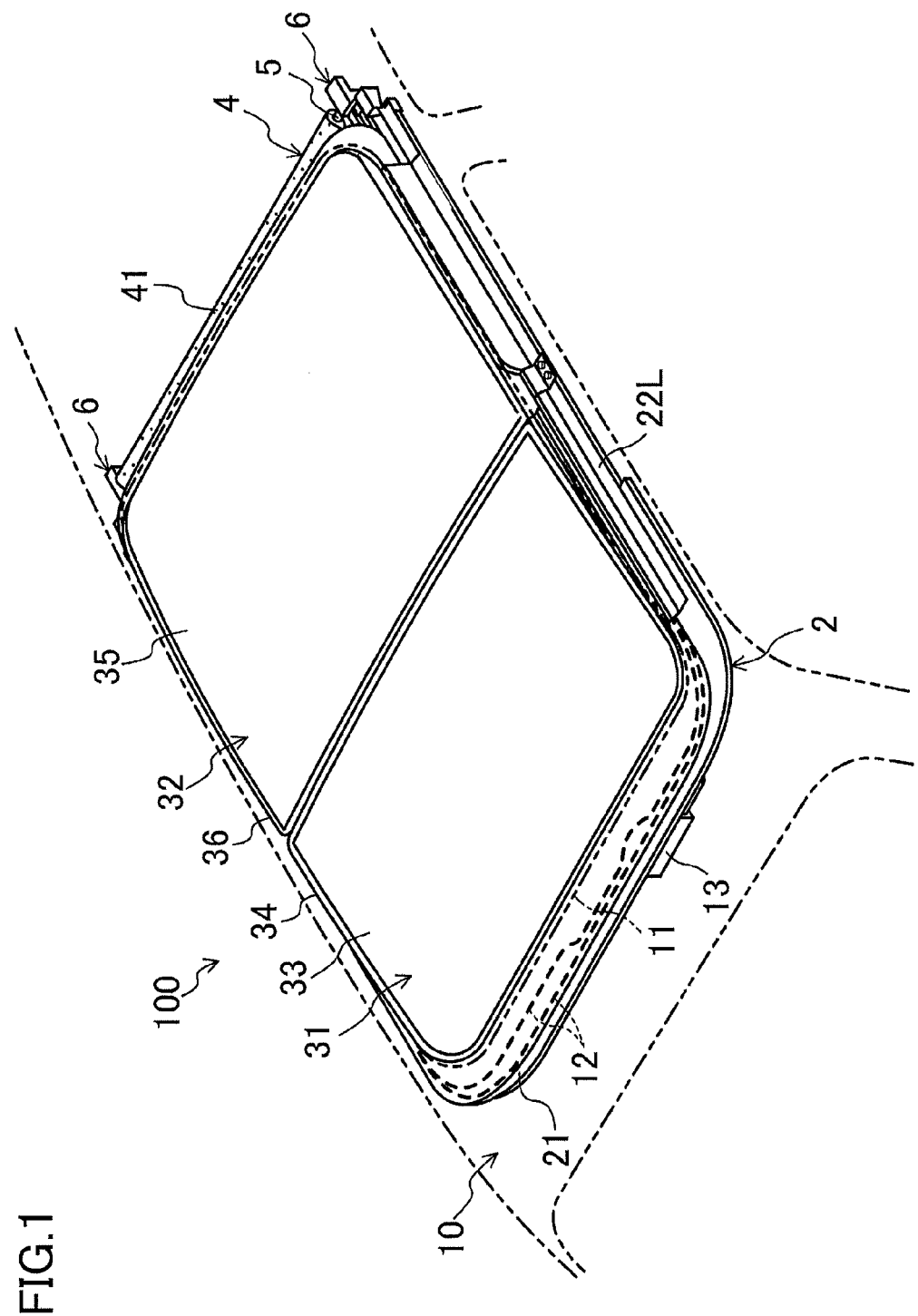
FIG. 1 is a perspective view of a sliding roof apparatus when a movable panel is in a fully-closed state.
Figure 2:
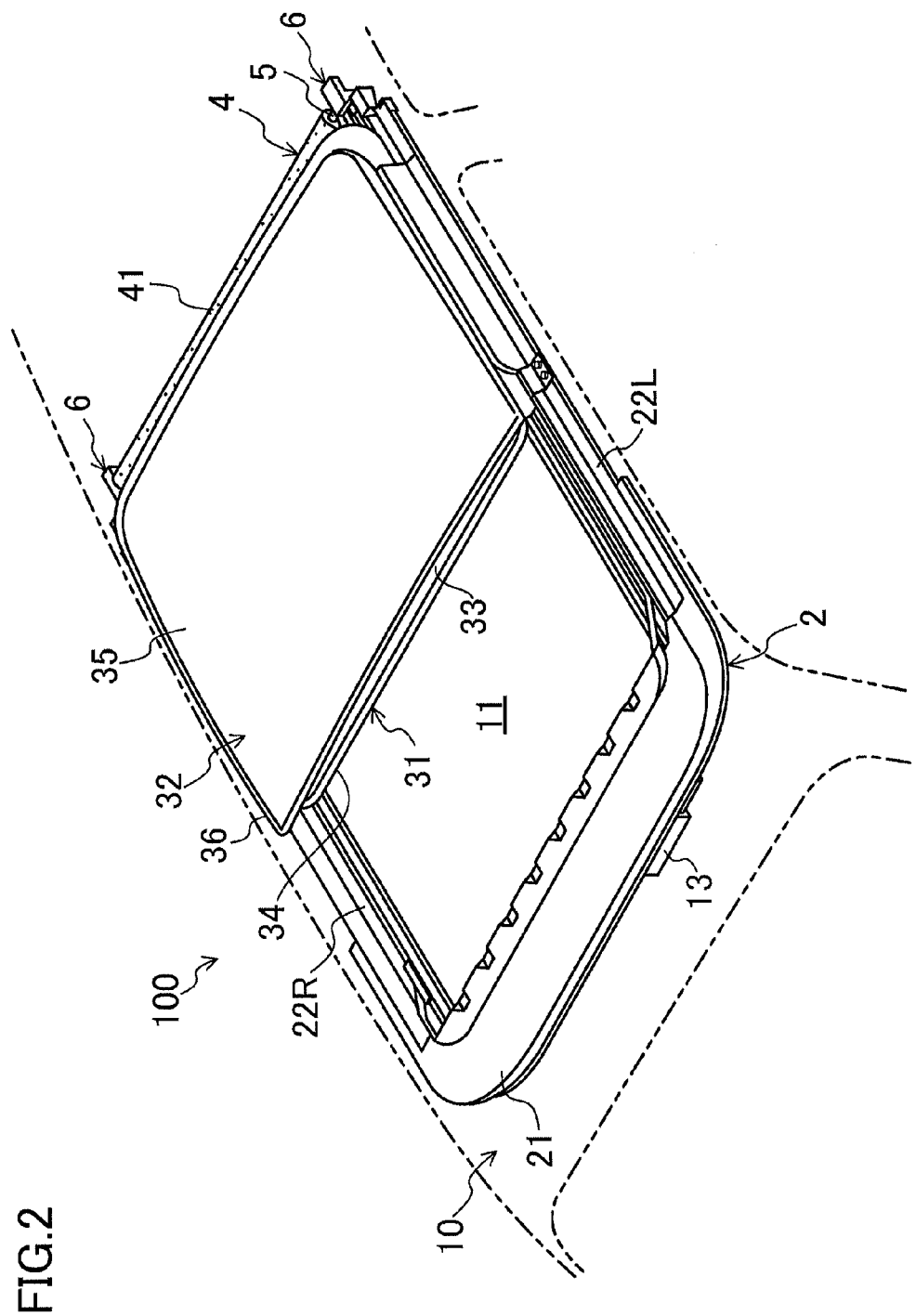
FIG. 2 is a perspective view of the sliding roof apparatus when the movable panel is in a fully-open state.

FIG. 1 is a perspective view of a sliding roof apparatus 100 when a movable panel 31 is in a fully-closed state. FIG. 2 is a perspective view of the sliding roof apparatus 100 when the movable panel 31 is in a fully-open state. For the sake of simplicity of description, in the present specification, the front side in a longitudinal direction of a vehicle is referred to as "front," the rear side in the longitudinal direction of the vehicle is referred to as "rear," the left side in a vehicle width direction is referred to as "left," and the right side in the vehicle width direction is referred to as "right."

<Outline of Configuration of Sliding Roof Apparatus>

The sliding roof apparatus 100 is disposed at an opening 11 formed in a roof 10 of a vehicle. The sliding roof apparatus 100 includes a frame 2 extending according to the edge of the opening 11, the movable panel 31 movably attached to the frame 2, a fixed panel 32 fixed to the frame 2, and a roll-screen device 4 provided on the roof 10 inside a vehicle compartment. The movable panel 31 is configured to open/close the opening 11.

In the fully-closed state illustrated in FIG. 1, the movable panel 31 covers a front part of the opening 11. The fixed panel 32 covers a rear part of the opening 11. In the fully-closed state, the opening 11 is fully closed by the movable panel 31 and the fixed panel 32.

A rear end part of the movable panel 31 is at a lower level in an open state than in the fully-closed state, and is drawn to below the fixed panel 32 in the open state. Referring to FIG. 2, in the fully-open state in which the movable panel 31 is opened to the maximum extent, the movable panel 31 and the fixed panel 32 substantially overlap with each other, and the opening 11 is opened.

Although not shown in the figure, the movable panel 31 is in a tilted state. In the tilted state, the movable panel 31 tilts such that a rear edge thereof is above a front edge of the fixed panel 32, and a clearance for ventilation is formed between the rear edge of the movable panel 31 and the front edge of the fixed panel 32.

The movable panel 31 includes a substantially rectangular glass panel 33 and a weatherstrip 34 provided along the periphery of the glass panel 33. The fixed panel 32 includes a substantially rectangular glass panel 35 and a weatherstrip 36 provided along the periphery of the glass panel 35. The glass panel 33 and the glass panel 35 are transparent, and serve as a transparent section through which light passes. The movable panel 31 and the fixed panel 32 are an example of a window section.

Figure 3:
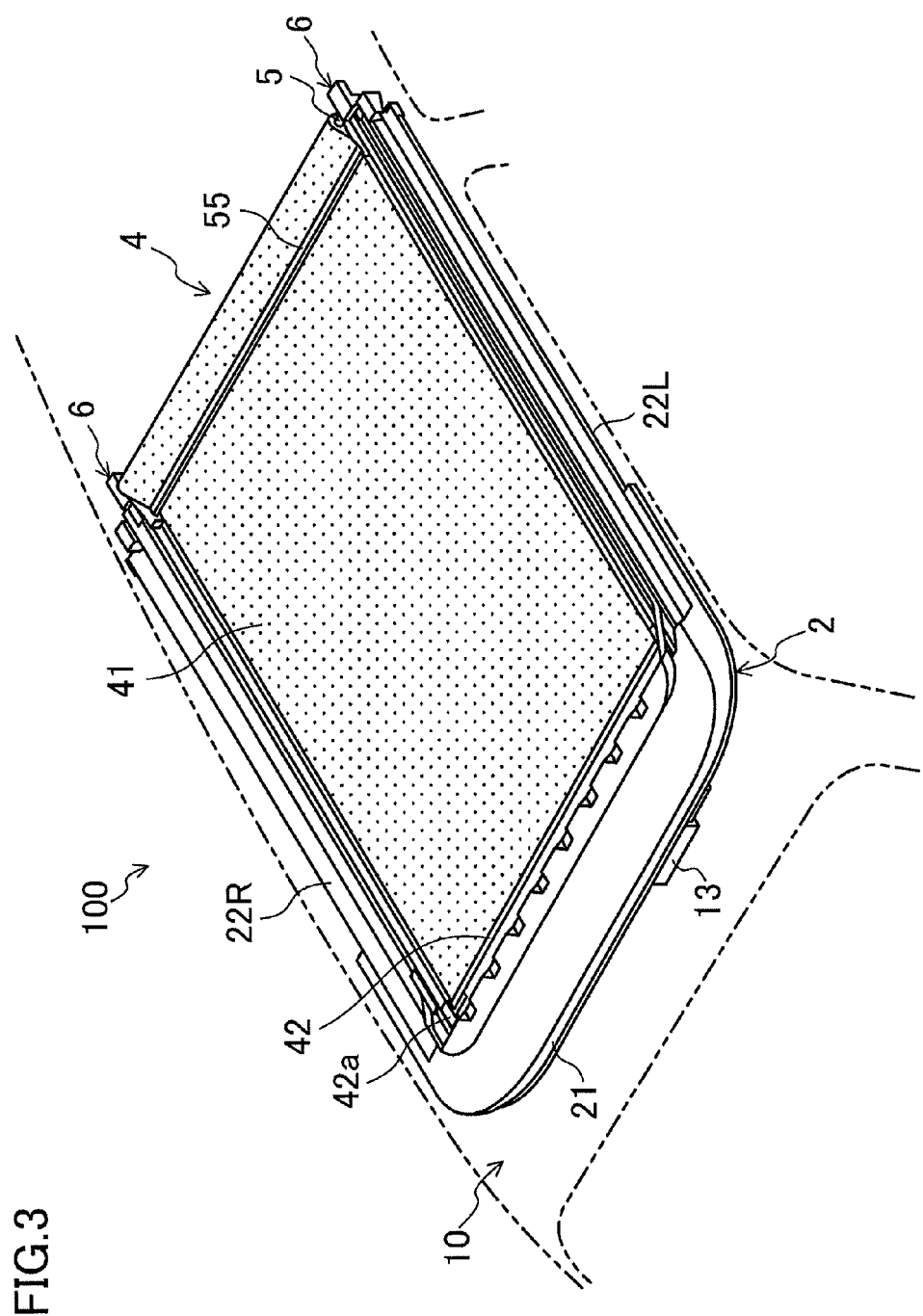
FIG. 3 is a perspective view of the sliding roof apparatus in the state in which the movable panel and a fixed panel are detached and in which a roll-screen device is in an unrolled state.
Figure 4:
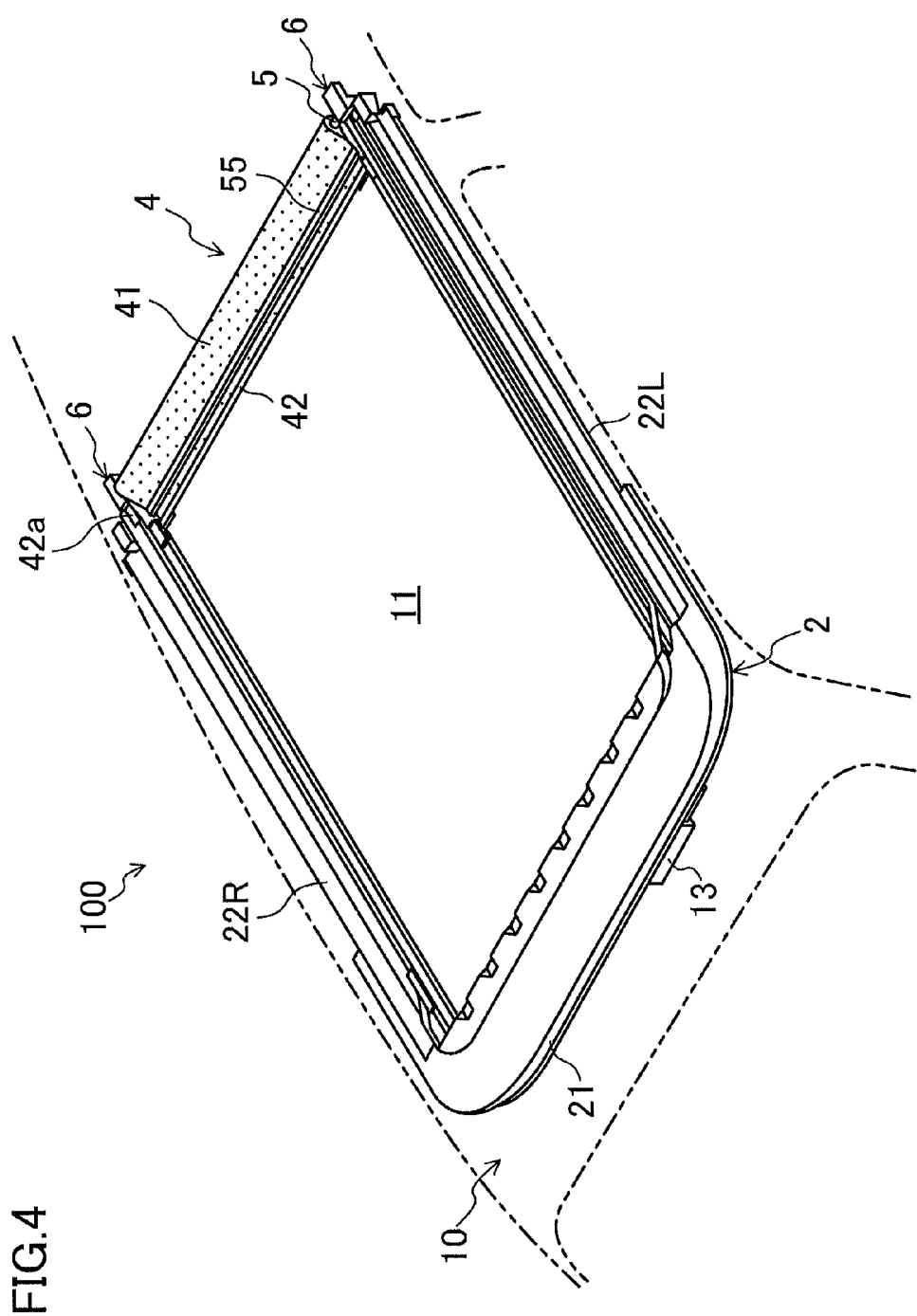
FIG. 4 is a perspective view of the sliding roof apparatus in the state in which the movable panel and the fixed panel are detached and in which the roll-screen device is in a rolled-up state.

FIG. 3 is a perspective view of the sliding roof apparatus 100 in the state in which the movable panel 31 and the fixed panel 32 are detached and in which the roll-screen device 4 is in an unrolled state. FIG. 4 is a perspective view of the sliding roof apparatus 100 in the state in which the movable panel 31 and the fixed panel 32 are detached and in which the roll-screen device 4 is in a rolled-up state.

The frame 2 includes a front frame 21 extending in the substantially vehicle width direction, and right and left guide rails 22R, 22L extending in the longitudinal direction. The right guide rail 22R and the left guide rail 22L are made of an aluminum alloy. The right guide rail 22R and the left guide rail 22L are configured to be bilaterally symmetric with each other. The right and left guide rails 22R, 22L are sometime simply referred to as a "guide rail 22" or "guide rails 22" without distinction.

A plurality of push-pull cables 12 lie in the front frame 21, the right guide rail 22R, and the left guide rail 22L (see FIG. 1). The push-pull cable 12 is a geared cable whose outer circumferential surface is formed with a gear section. A drive motor 13 configured to drive the push-pull cables 12 is attached to the front frame 21. The push-pull cables 12 engage with the drive motor 13.

The movable panel 31 is slidably connected to the right guide rail 22R and the left guide rail 22L through right and left connection members (not shown in the figure). The connection member is provided in the guide rail 22, and engages with a slider (not shown in the figure) driven through the push-pull cable 12. The slider is driven through the push-pull cable 12 to slide the connection member along the guide rail 22 and to tilt the connection member up and down. Accordingly, the movable panel 31 slides back and forth, and tilts up and down.

The roll-screen device 4 is provided below the movable panel 31 and the fixed panel 32. Although will be described in detail later, the roll-screen device 4 is configured such that a light-shielding sheet 41 can be rolled up on a winding roller 5. Referring to FIG. 3, in a fully-unrolled state in which the light-shielding sheet 41 is fully unrolled from the winding roller 5, the light-shielding sheet 41 shields the movable panel 31 and the fixed panel 32 from light, i.e., blocks light from entering the vehicle compartment from the outside through the movable panel 31 and the fixed panel 32. On the other hand, in the rolled-up state in which the light-shielding sheet 41 is rolled up on the winding roller 5 as illustrated in FIG. 4, the light-shielding sheet 41 unshields the movable panel 31 and the fixed panel 32, i.e., does not block light from entering the vehicle compartment from the outside through the movable panel 31 and the fixed panel 32.

<Outline of Configuration of Roll-Screen Device>

Figure 5:
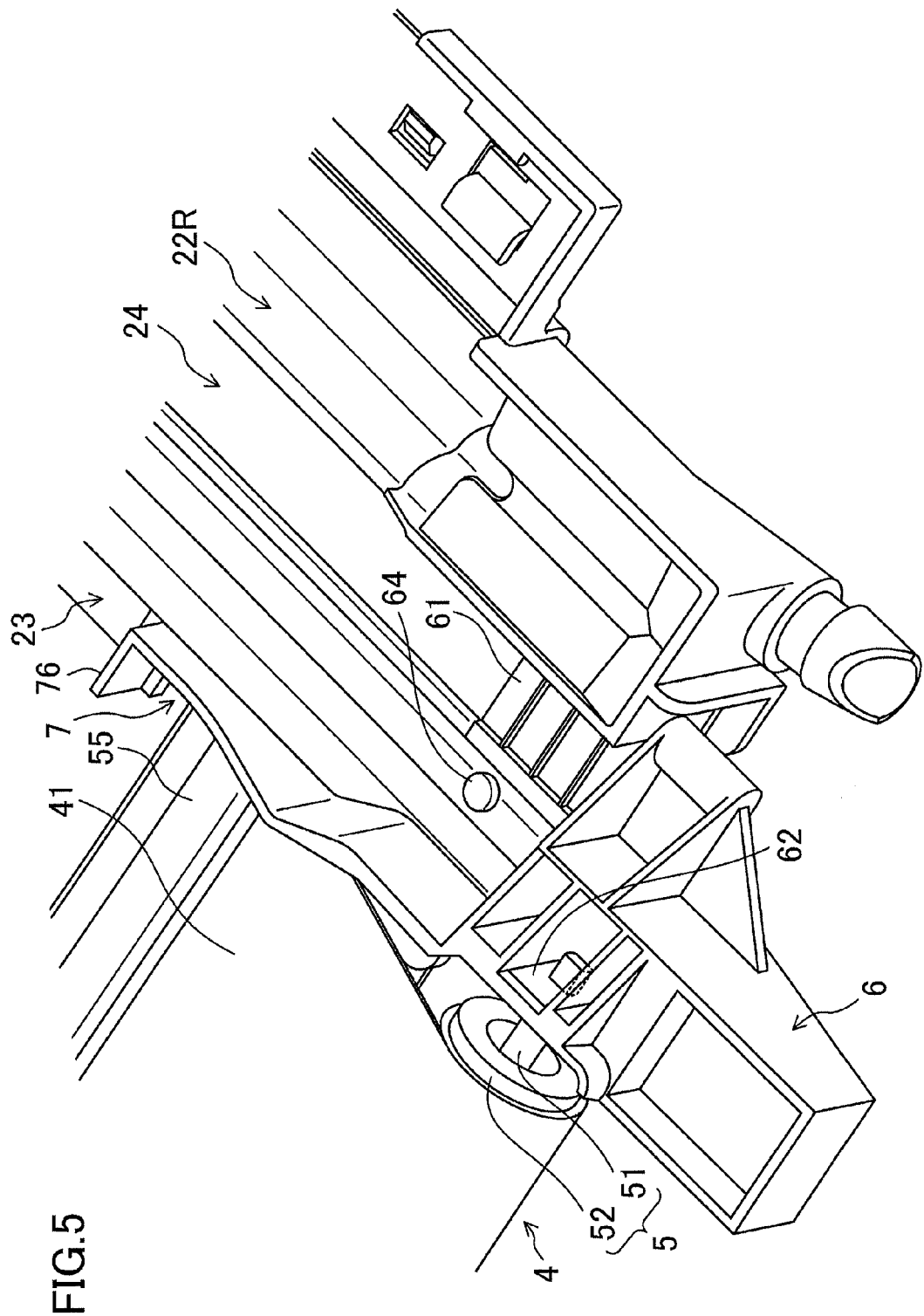
FIG. 5 is a perspective view of the roll-screen device from the outside.
Figure 6:
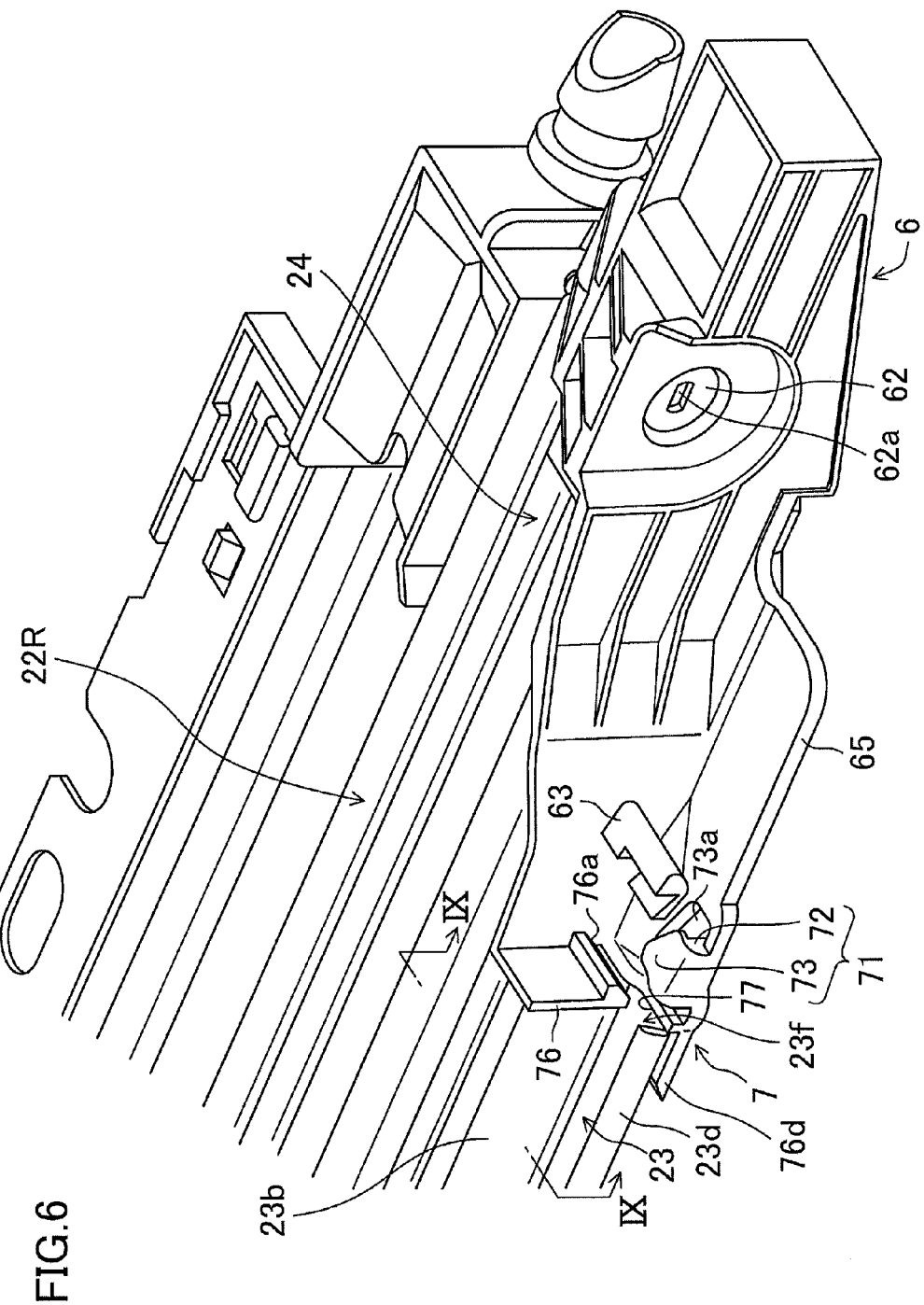
FIG. 6 is a perspective view of the roll-screen device from the inside.

The configuration of the roll-screen device 4 will be described in detail below. FIG. 5 is a perspective view of the roll-screen device 4 from the outside. FIG. 6 is a perspective view of the roll-screen device 4 from the inside. Note that the light-shielding sheet 41, the winding roller 5, and a depressing member 55 are not shown in FIG. 6.

The roll-screen device 4 is an electric roll-screen device. The roll-screen device 4 includes the light-shielding sheet 41, the winding roller 5 on which the light-shielding sheet 41 can be rolled up, two support blocks 6 configured to support the winding roller 5, guide sections 7 each provided in a corresponding one of the support blocks 6 and each configured to guide, to a corresponding one of the guide rails 22, the light-shielding sheet 41 drawn from the winding roller 5, and the depressing member 55 configured to guide the light-shielding sheet 41 to reduce uplifting of the light-shielding sheet 41. Moreover, the right guide rail 22R and the left guide rail 22L form part of the roll-screen device 4. The right guide rail 22R and the left guide rail 22L function to guide the light-shielding sheet 41. The light-shielding sheet 41 is located below the movable panel 31 and the fixed panel 32 in the state in which the light-shielding sheet 41 is unrolled from the winding roller 5, thereby blocking light from entering the vehicle compartment through the movable panel 31 and the fixed panel 32.

Each support block 6 is attached to a rear end part of a corresponding one of the right and left guide rails 22R, 22L. The support block 6 includes an attachment section 61 to be attached to the guide rail 22, a support section 62 configured to support a shaft 51 of the winding roller 5, a support pin 63 configured to support the depressing member 55, and the guide section 7. The support block 6 is an insert-molded component formed by integral molding of a metal plate and resin.

The attachment section 61 is formed in such a substantially plate shape that the attachment section 61 can be inserted into a rear end of the guide rail 22. Specifically, a passage 24 in which the connection member and slider for the movable panel 31 move is formed on the outside of a later-described sheet passage 23 in the vehicle width direction. The attachment section 61 is inserted into a rear end part of the passage 24. The attachment section 61 is, with a tapping screw 64, fastened to a wall section forming the passage 24

The support section 62 is formed of a metal plate. A through-hole 62a is formed in the support section 62. The through-hole 62a is an elongated opening. Referring to FIG. 5, an end part of the shaft 51 of the winding roller 5 has a flat cross-sectional shape, and is inserted into the through-hole 62a. Since the through-hole 62a and the end part of the shaft 51 are not in a perfect circular shape, the support sections 62 unrotatably support the shaft 51.

The support pin 63 is located on the front relative to the support section 62 and on the rear relative to a rear end of the guide section 7. The support pin 63 protrudes inward in the vehicle width direction, and engages with an end part of the depressing member 55. Thus, the support pins 63 support the depressing member 55.

In part of the support block 6 on the front relative to the support pin 63, the guide section 7 is provided. The configuration of the guide section 7 will be described in detail later.

The winding roller 5 includes the shaft 51, a roller body 52, a biasing mechanism (not shown in the figure) built in the roller body 52. In the attitude in which the winding roller 5 extends in the vehicle width direction, the winding roller 5 is attached to the rear end part of the right guide rail 22R through one of the support blocks 6, and is attached to the rear end part of the left guide rail 22L through the other support block 6. Each end part of the shaft 51 protrudes outward from a corresponding one of end parts of the roller body 52, and is unrotatably attached to a corresponding one of the support blocks 6. The light-shielding sheet 41 is connected to the roller body 52. The roller body 52 is, by the biasing mechanism (not shown in the figure), biased in one direction about the shaft 51. Thus, the light-shielding sheet 41 is rolled up on the roller body 52 by biasing force of the biasing mechanism.

The light-shielding sheet 41 is a cloth sheet having light shielding properties. The light-shielding sheet 41 is in a substantially rectangular shape. A rear edge of the light-shielding sheet 41 is connected to the roller body 52. Referring to FIGS. 3 and 4, a garnish 42 extending in the vehicle width direction is attached to the light-shielding sheet 41 along a front edge thereof. A slider 42a is provided at each end of the garnish 42 in the vehicle width direction. Each slider 42a is guided by a corresponding one of the right and left guide rails 22R, 22L, and is connected to a corresponding one of the push-pull cables 12. That is, when the push-pull cables 12 are driven by the drive motor 13, the garnish 42 moves back and forth along the guide rails 22. When the garnish 42 moves to the front, the light-shielding sheet 41 is drawn from the roller body 52 against the biasing force of the biasing mechanism. On the other hand, when the garnish 42 moves to the rear, the light-shielding sheet 41 is rolled up on the roller body 52 by the biasing force of the biasing mechanism.

Although will be described in detail later, the sheet passages 23 extending in the longitudinal direction are formed on the inside of the guide rails 22 in the vehicle width direction. Each side edge part (hereinafter simply referred to as a "side edge part") of the light-shielding sheet 41 on both sides in the vehicle width direction, i.e., each side edge part of the light-shielding sheet 41 on the right and left, is fitted into a corresponding one of the sheet passages 23 of the right and left guide rails 22R, 22L. When the light-shielding sheet 41 moves back and forth, each side edge part of the light-shielding sheet 41 is guided by a corresponding one of the right and left guide rails 22R, 22L.

The depressing member 55 depresses one side of the light-shielding sheet 41 drawn from the winding roller 5, thereby adjusting the height position of the light-shielding sheet 41. The depressing member 55 is supported by the support blocks 6 in the attitude in which the depressing member 55 extends in the vehicle width direction on the front of the winding roller 5. The depressing member 55 is located at the substantially same level as that of the sheet passages 23. The depressing member 55 is made of an aluminum alloy. The shaft 51 of the winding roller 5 is disposed at a level higher than that of the sheet passages 23, and the light-shielding sheet 41 winded into a roll is drawn from above the winding roller 5 toward the front. Thus, the light-shielding sheet 41 drawn from the winding roller 5 obliquely downwardly extends from the position higher than the sheet passages 23 toward the front to enter the sheet passages 23. At this point, the light-shielding sheet 41 passes below the depressing member 55 such that the depressing member 55 holds the light-shielding sheet 41 at the substantially same level as that of the sheet passages 23. In the absence of the depressing member 55, the light-shielding sheet 41 warps upward from rear ends of the sheet passages 23 to the winding roller 5, resulting in degradation of the appearance of the light-shielding sheet 41 inside the vehicle compartment. On the other hand, part of the light-shielding sheet 41 which has been just drawn from the winding roller 5 is held downward by the depressing member 55. Thus, uplifting in part of the light-shielding sheet 41 near the winding roller 5 is reduced, and the appearance of the light-shielding sheet 41 inside the vehicle compartment is enhanced. Moreover, since the level of the light-shielding sheet 41 right before the light-shielding sheet 41 enters the sheet passages 23 can be close to that of the sheet passages 23, the light-shielding sheet 41 can be smoothly enter the sheet passages 23.

<Structure for Guiding Light-Shielding Sheet Along Guide Rails>

Figure 7:
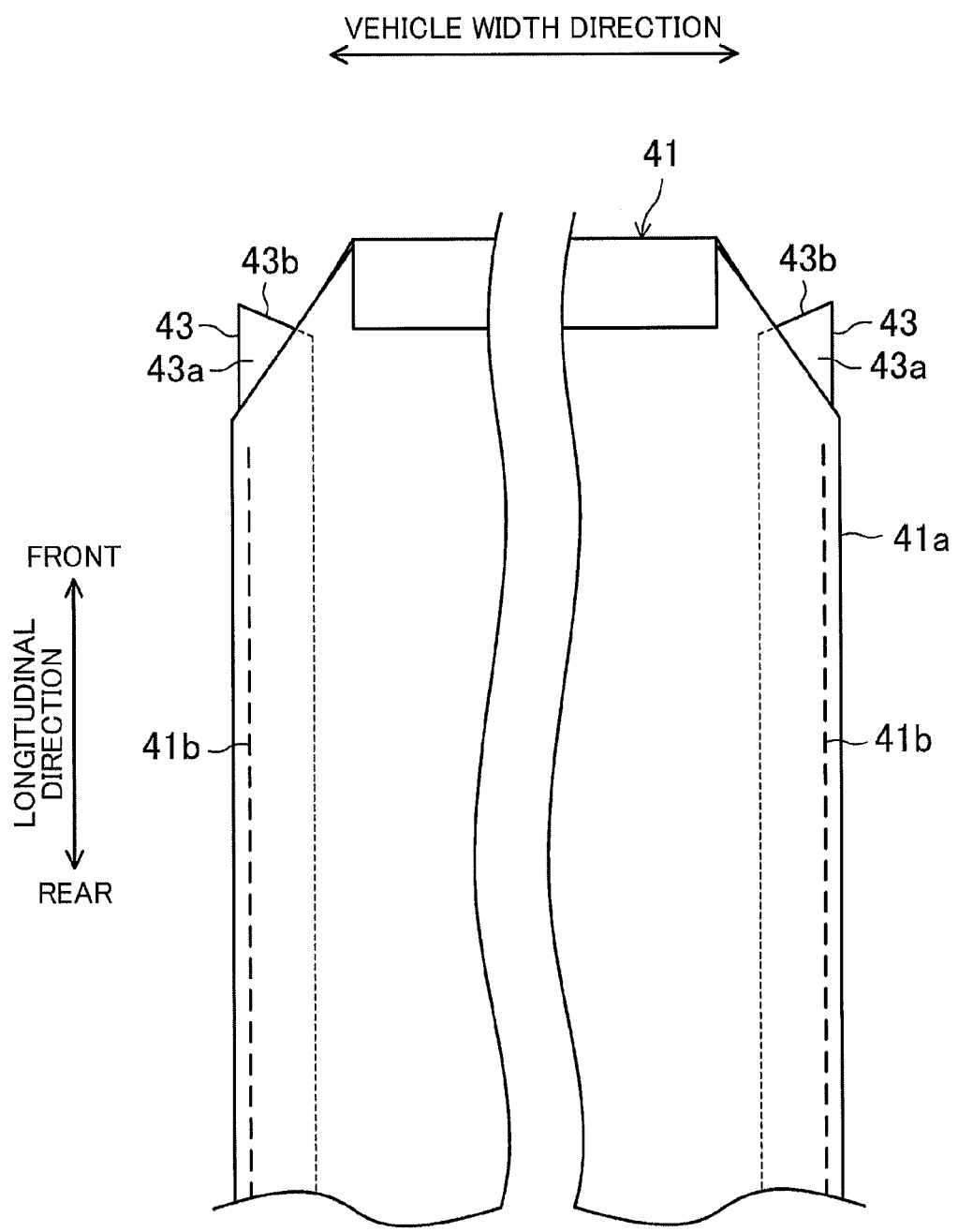
FIG. 7 is a plan view of a light-shielding sheet.
Figure 8:
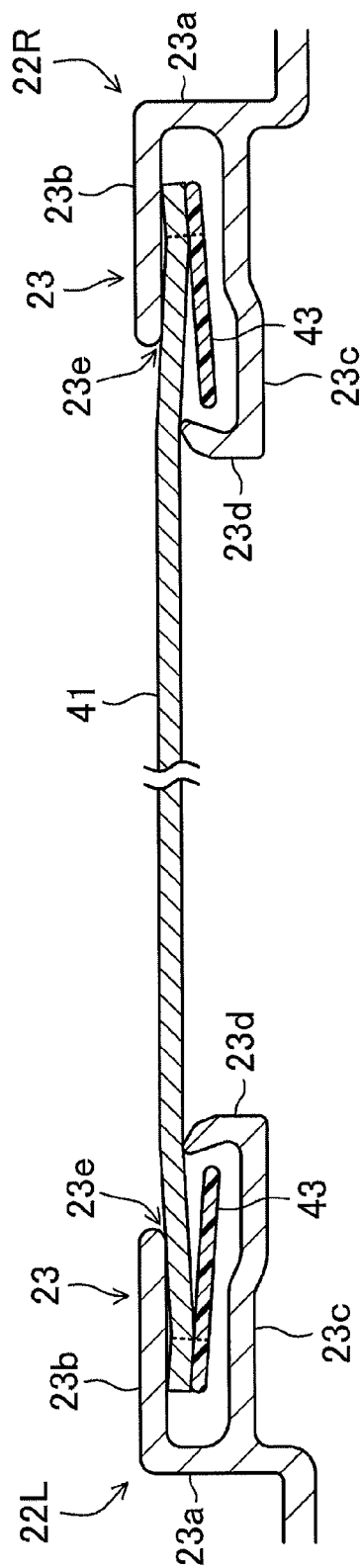
FIG. 8 is a cross-sectional view of sheet passages and the light-shielding sheet.

Next, the structure for guiding the light-shielding sheet 41 along the sheet passages 23 will be described in detail. FIG. 7 is a plan view of the light-shielding sheet 41. FIG. 8 is a cross-sectional view of the sheet passages 23 and the light-shielding sheet 41.

Referring to FIG. 7, the light-shielding sheet 41 includes a rectangular sheet body 41a and engagement belts 43 each extending in the longitudinal direction along a corresponding one of side edge parts of the sheet body 41a in the vehicle width direction, i.e., along a corresponding one of right and left side edge parts of the sheet body 41a. The engagement belt 43 is formed as a member different from the sheet body 41a. The engagement belt 43 is connected to the sheet body 41a at a seam 41b. The seam 41b is formed relatively on the outside in the vehicle width direction in the engagement belt 43. The engagement belt 43 is made of, e.g., resin. However, the material of the engagement belt 43 is not limited to resin, and the engagement belt 43 may be made of an elastic body such as rubber. Alternatively, the engagement belt 43 may be formed in such a manner that the side edge part of the sheet body 41a is folded back. That is, the engagement belt 43 may be formed integrally with the sheet body 41a.

The engagement belt 43 is configured such that at least an inner edge part of the engagement belt 43 in the vehicle width direction is apart from the sheet body 41a to form a clearance between the inner edge part of the engagement belt 43 and the sheet body 41a. Since the seam 41b is formed relatively on the outside in the vehicle width direction in the engagement belt 43, the clearance is easily formed between the inner edge part of the engagement belt 43 in the vehicle width direction and the sheet body 41a.

A tip end part 43a of the engagement belt 43 which is a forefront of the engagement belt 43 upon entering of the engagement belt 43 into the guide rail 22 is not sewn to the sheet body 41a. That is, the tip end part 43a of the engagement belt 43 is not connected to the sheet body 41a, and is free from the sheet body 41a.

The tip end part 43a of the engagement belt 43 partially protrudes out from the sheet body 41a. Specifically, a corner part between a front edge and a side edge of the sheet body 41a is obliquely cut off. The tip end part 43a of the engagement belt 43 protrudes out from the oblique edge of the sheet body 41a toward the front. Note that not only part of the tip end part 43a of the engagement belt 43 protruding out from the sheet body 41a but also part of the tip end part 43a of the engagement belt 43 lying on the sheet body 41a are not sewn to the sheet body 41a.

A tip edge 43b of the engagement belt 43 is not perpendicular to the longitudinal direction (i.e., not parallel to the vehicle width direction), but is inclined relative to the longitudinal direction (i.e., inclined relative to the vehicle width direction). Specifically, the tip edge 43b of the engagement belt 43 is inclined so as to extend forward and outward in the vehicle width direction.

Next, the configuration of the sheet passage 23 will be described. Referring to FIG. 8, the following wall sections form the sheet passage 23: a vertical wall section 23a located on the outside of the side edge part of the light-shielding sheet 41 in the vehicle width direction and standing in the vertical direction; an upper wall section 23b extending inward in the vehicle width direction from an upper end of the vertical wall 23a; a lower wall section 23c extending inward in the vehicle width direction from a lower end of the vertical wall 23a; and an engagement wall section 23d extending upward from an inner end of the lower wall section 23c in the vehicle width direction. All of the vertical wall section 23a, the upper wall section 23b, the lower wall section 23c, and the engagement wall section 23d extend in the longitudinal direction. The lower wall section 23c includes a step, and an inner part of the lower wall section 23c in the vehicle width direction is located lower than an outer part of the lower wall section 23c in the vehicle width direction. The engagement wall section 23d is inclined so as to extend upward and outward in the vehicle width direction.

The lower wall section 23c extends inward in the vehicle width direction beyond the upper wall section 23b. That is, the engagement wall section 23d is located on the inside in the vehicle width direction relative to an inner edge of the upper wall section 23b in the vehicle width direction. Thus, the inner edge of the upper wall section 23b in the vehicle width direction and an upper edge of the engagement wall section 23d form a slit 23e extending in the longitudinal direction, and the sheet passage 23 opens at the slit 23e.

The side edge part of the sheet body 41a and the engagement belt 43 are inserted into the sheet passage 23 through the slit 23e. In such a state, the upper wall section 23b faces an upper surface of the side edge part of the sheet body 41a, and the lower wall section 23c faces a lower surface of the engagement belt 43. The engagement wall section 23d is located below the sheet body 41a on the inside of the engagement belt 43 in the vehicle width direction.

As just described, the sheet passage 23 houses the side edge part of the sheet body 41a and the engagement belt 43, and guides the side edge part of the sheet body 41a and the engagement belt 43 in the longitudinal direction. Typically, the sheet body 41a is guided in the longitudinal direction while slidably contacting an upper end of the engagement wall section 23d and the upper wall section 23b. The engagement wall section 23d is located on the inside of the engagement belt 43 in the vehicle width direction, and engages with the engagement belt 43. The engagement belt 43 provided on the sheet body 41a and the engagement wall section 23d provided in the sheet passage 23 prevents the sheet body 41a from disengaging from the sheet passage 23, i.e., prevents the light-shielding sheet 41 from falling out of the sheet passage 23. Since the light-shielding sheet 41 has flexibility, the right and left side edge parts of the light-shielding sheet 41 move inward in the vehicle width direction when, e.g., a middle part of the light-shielding sheet 41 in the vehicle width direction warps downward due to the weight thereof. When the light-shielding sheet 41 moves toward either right or left, one of the side edge parts of the light-shielding sheet 41 moves inward in the vehicle width direction. However, since the engagement wall section 23d is located on the inside of the engagement belt 43 in the vehicle width direction, the engagement belt 43 is caught by the engagement wall section 23d, and therefore inward movement of the light-shielding sheet 41 in the vehicle width direction is reduced or prevented. Thus, engagement between the light-shielding sheet 41 and each sheet passage 23 is maintained.

<Structure for Guiding Light-Shielding Sheet to Guide Rails>

When the light-shielding sheet 41 configured as described above is rolled up on the winding roller 5, the light-shielding sheet 41 comes out of the sheet passages 23, and is not guided along the sheet passages 23. In the state (i.e., the rolled-up state) in which the light-shielding sheet 41 is fully rolled up on the winding roller 5, the entirety of the light-shielding sheet 41 is outside the sheet passages 23. In the state in which the light-shielding sheet 41 is rolled up on the winding roller 5, the sheet body 41a and each engagement belt 43 lie on each other. Thus, when the light-shielding sheet 41 is drawn from the rolled-up state, it is necessary that the light-shielding sheet 41 is properly guided into the sheet passages 23. Specifically, it is necessary to bring about the state in which each side edge part of the sheet body 41a is housed in a corresponding one of the sheet passages 23, the other part of the sheet body 41a extends out of each sheet passage 23 through a corresponding one of the slits 23e, and the entirety of each engagement belt 43 is housed in a corresponding one of the sheet passages 23.

Figure 9:
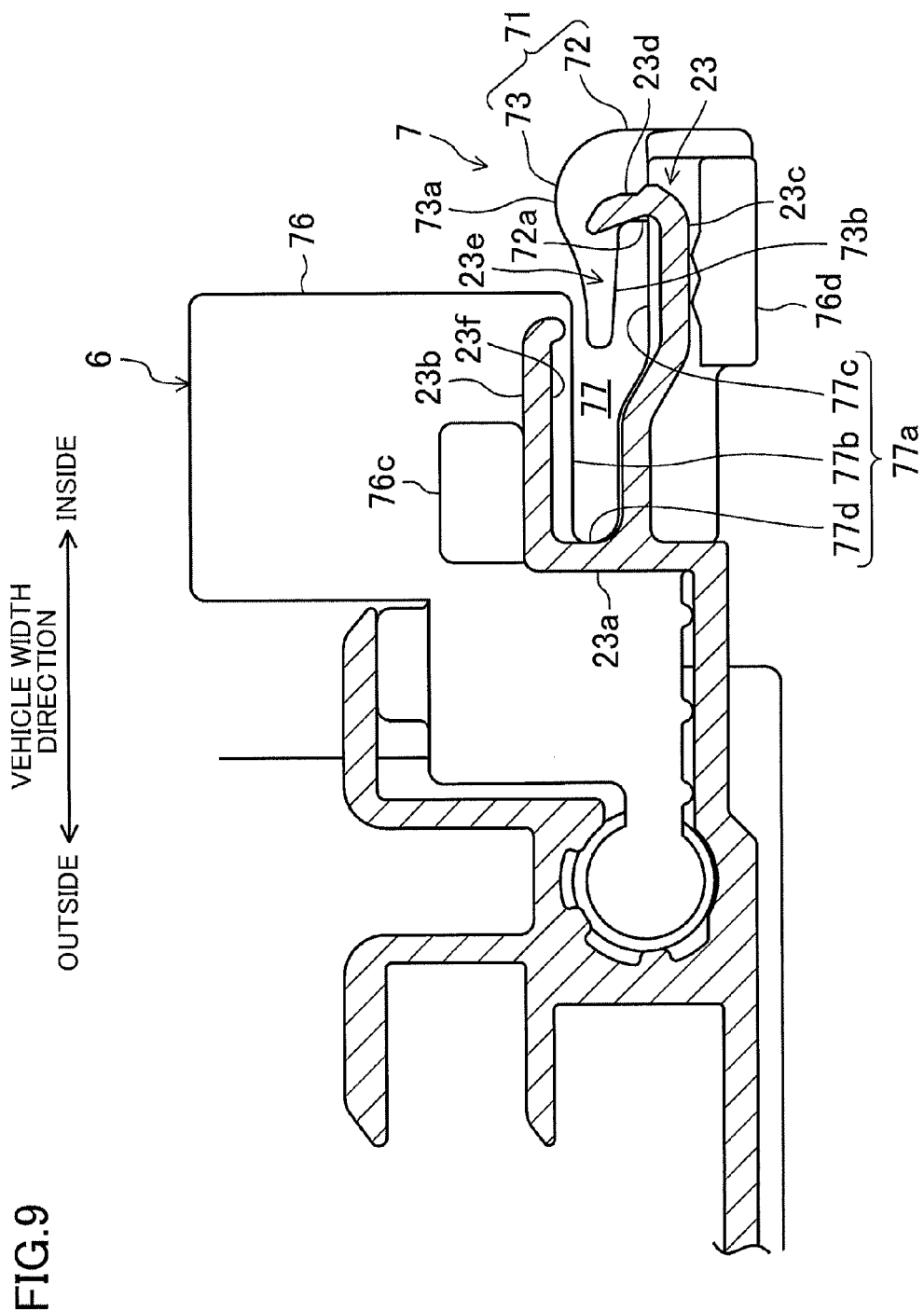
FIG. 9 is a cross-sectional view of a guide rail along an IX-IX line illustrated in FIG. 6.
Figure 10:
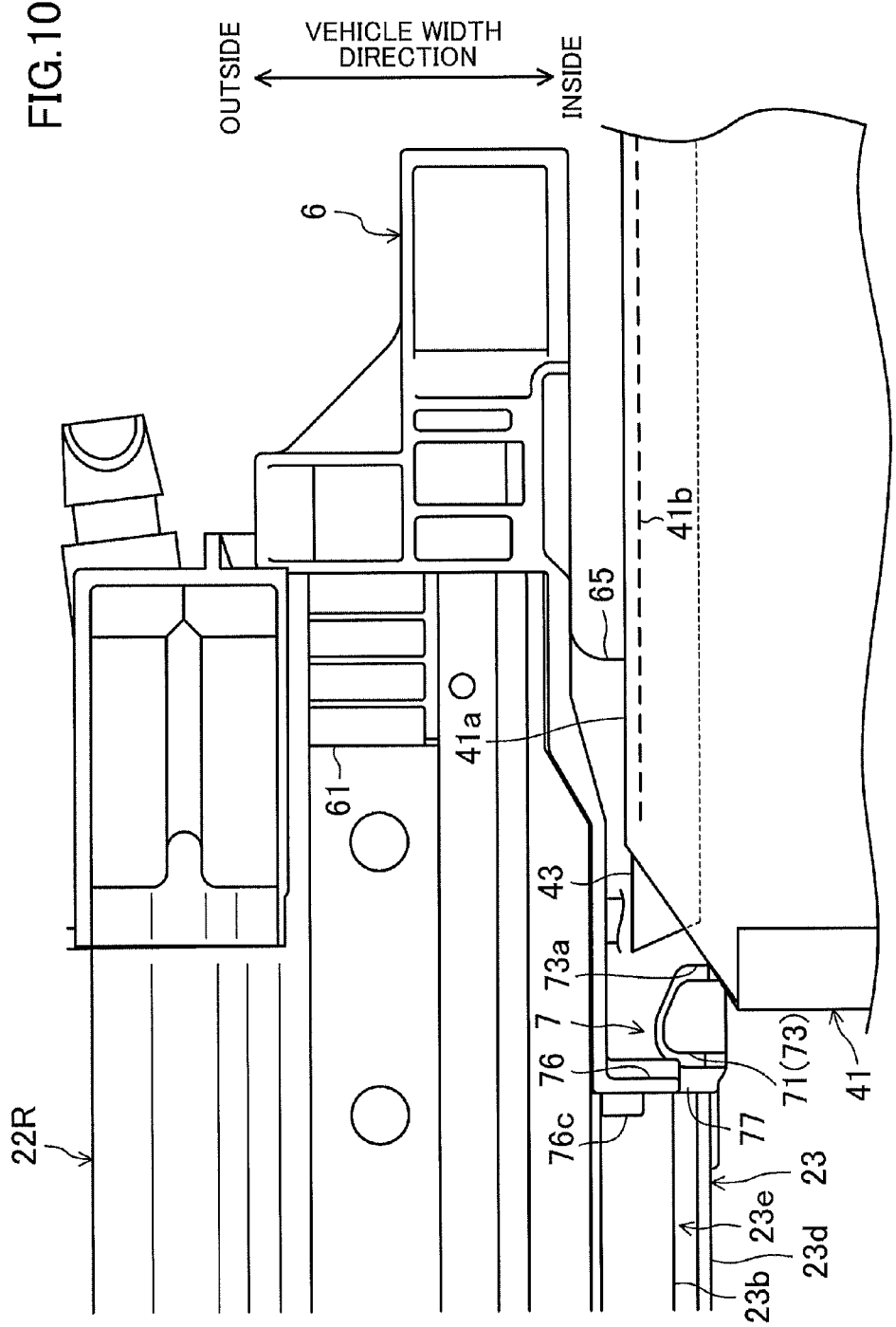
FIG. 10 is a plan view of the roll-screen device mainly illustrating a guide section.
Figure 11:
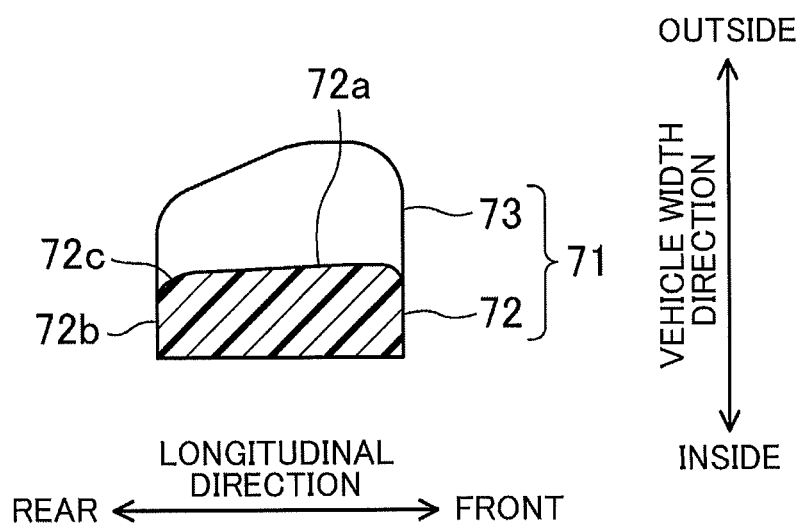
FIG. 11 is a bottom view of a guide piece in a horizontal cross section of an inner wall.

In the support block 6, the guide section 7 is provided, which is configured to properly guide the light-shielding sheet 41 drawn from the winding roller 5 into the guide rail 22. Referring to FIG. 6, the guide section 7 causes the light-shielding sheet 41 to enter the sheet passage 23 through an entrance port 23f formed at the rear end of the guide rail 22. FIG. 9 is a cross-sectional view of the guide rail 22 along an IX-IX line illustrated in FIG. 6. FIG. 10 is a plan view of the roll-screen device 4 mainly illustrating the guide section 7. FIG. 11 is a bottom view of a guide piece 71 in a horizontal cross section of an inner wall 72.

Referring to FIG. 6, the guide section 7 includes the guide piece 71 configured to put distance between the engagement belt 43 and the sheet body 41a before the light-shielding sheet 41 enters the guide rail 22, and a guide wall 76 provided closer to the guide rail 22 relative to the guide piece 71 and configured to guide the light-shielding sheet 41 to the entrance port 23f.

The guide piece 71 is provided on a horizontal wall 65 of the support block 6. The guide piece 71 includes the inner wall 72 extending upward from the horizontal wall 65, and a separation wall 73 connected to the inner wall 72.

The inner wall 72 is configured to guide the engagement belt 43 and determine the position of the engagement belt 43 in the vehicle width direction. Specifically, a surface (hereinafter referred to as an "outer surface") 72a of the inner wall 72 facing outward in the vehicle width direction guides the engagement belt 43 such that the engagement belt 43 passes on the outside of the outer surface 72a in the vehicle width direction. Referring to FIG. 9, the outer surface 72a is located on the outside of the engagement wall section 23d of the sheet passage 23 in the vehicle width direction. That is, the inner wall 72 guides the engagement belt 43 toward the outside of the engagement wall section 23d in the vehicle width direction.

Referring to FIG. 11, the outer surface 72a is inclined inward in the vehicle width direction with decreasing distance to the winding roller 5, i.e., is inclined so as to extend backward and inward in the vehicle width direction. Of the inner wall 72, a ridge section 72c formed between the outer surface 72a and a surface 72b of the inner wall 72 facing the winding roller 5 has a curved surface.

Referring to FIGS. 6 and 9, the separation wall 73 extends, in the substantially horizontal direction, from the inner wall 72 toward the outside in the vehicle width direction. When the light-shielding sheet 41 is guided by the guide section 7, the separation wall 73 enters between the sheet body 41a and the engagement belt 43 to put distance between the light-shielding sheet 41 and the engagement belt 43. The separation wall 73 is formed thinner toward the outside in the vehicle width direction and toward the rear.

Referring to FIGS. 6 and 9, an opening 73a larger than the projection shape of the separation wall 73 on the horizontal wall 65 is formed in the horizontal wall 65. Since the opening 73a is formed, the guide piece 71 can be easily formed.

Referring to FIGS. 6 and 9, the guide wall 76 is adjacent to the rear end of the guide rail 22. A guide opening 77 facing the entrance port 23f of the guide rail 22 is formed in the guide wall 76.

Referring to FIG. 9, the guide opening 77 is in a shape corresponding to the entrance port 23f of the guide rail 22. Specifically, an opening edge 77a of the guide opening 77 includes an upper part 77b extending in the horizontal direction, a lower part 77c facing the upper part 77b, and a connection part 77d connecting between an outer end of the upper part 77b in the vehicle width direction and an outer end of the lower part 77c in the vehicle width direction. The lower part 77c is in a stepped shape, and an inner part of the lower part 77c in the vehicle width direction is located lower than an outer part of the lower part 77c in the vehicle width direction. An inner end of the upper part 77b in the vehicle width direction and an inner end of the lower part 77c in the vehicle width direction are not connected together. That is, the opening edge 77a is in an open shape. The guide opening 77 formed as just described is smaller than the entrance port 23f. That is, when the guide opening 77 is viewed from the rear, the opening edge of the entrance port 23f cannot be viewed.

Referring to FIG. 6, an inclined surface 76a is formed at the guide wall 76 to guide the light-shielding sheet 41 to the guide opening 77. The inclined surface 76a is a rear surface (i.e., a surface of the guide wall 76 opposite to the entrance port 23f) of the guide wall 76 formed above the guide opening 77. The inclined surface 76a is inclined so as to extend downward and forward. The inclined surface 76a continues to the upper part 77b of the opening edge 77a.

A first engagement section 76c and a second engagement section 76d engaged with the guide rail 22 when the support block 6 is attached to the guide rail 22 are provided on a surface of the guide wall 76 close to the guide rail 22. The first engagement section 76c engages with the upper wall section 23b at an upper surface thereof. The second engagement section 76d engages with the lower wall section 23c at a lower surface thereof.

Figure 12:
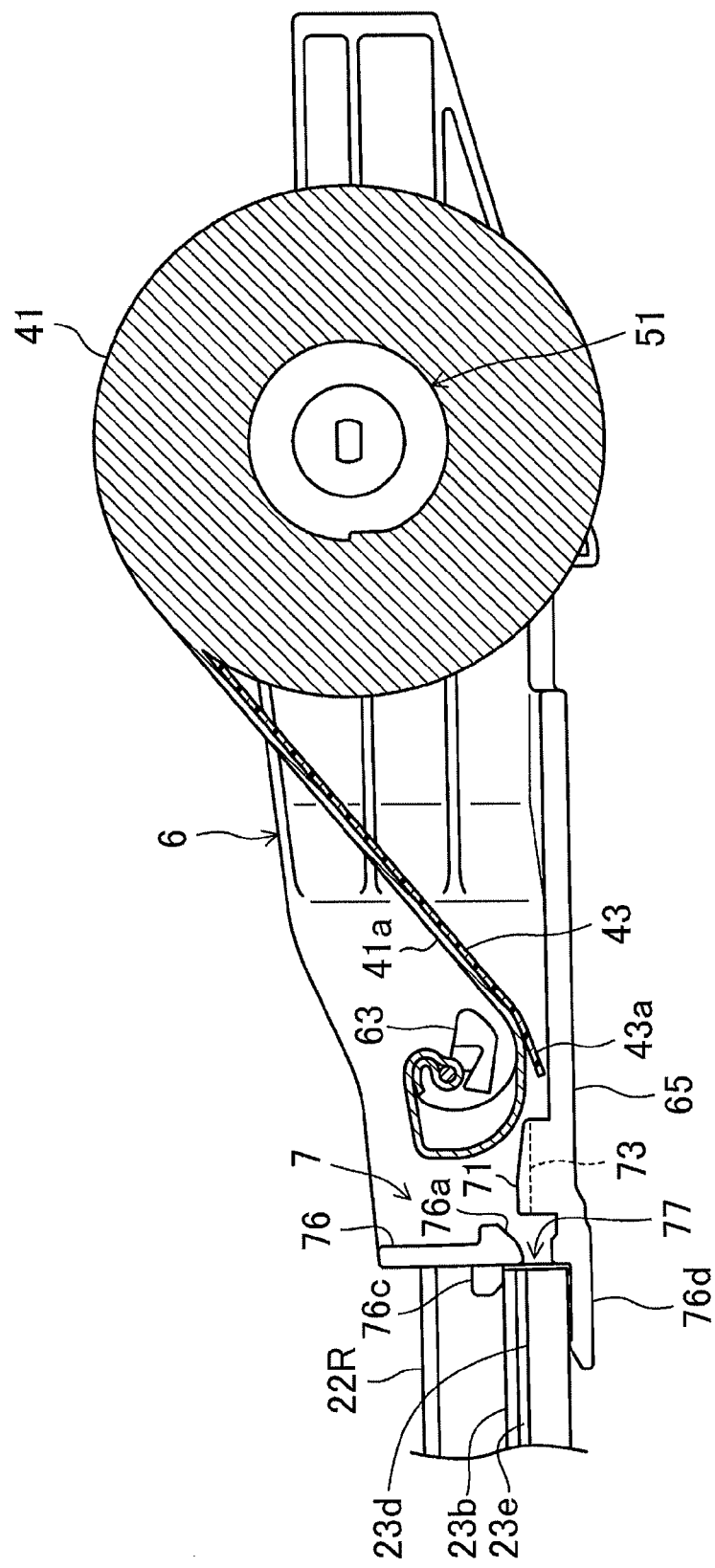
FIG. 12 is a side view of the roll-screen device from the inside.

Next, a process when the light-shielding sheet 41 is drawn from the rolled-up state to enter the sheet passages 23 of the guide rails 22 will be described. FIG. 12 is a side view of the roll-screen device 4 from the inside. Note that FIG. 12 illustrates the light-shielding sheet 41 and the winding roller 5 in a cross section extending in the longitudinal direction and the vertical direction. FIGS. 13(A) and 13(B) are views illustrating the state in which the light-shielding sheet 41 is about to engage with the guide pieces 71. FIG. 13(A) is a view of the light-shielding sheet 41 and the guide piece 71 from the above, and FIG. 13(B) is a view of the light-shielding sheet 41 and the guide piece 71 from the below. FIG. 14 is a cross-sectional view illustrating the state in which the separation wall 73 is interposed between the sheet body 41a and the engagement belt 43. FIG. 15 is a view illustrating the state in which the light-shielding sheet 41 have entered the sheet passage 23 through the guide opening 77.

Referring to FIG. 12, the light-shielding sheet 41 extends, in the rolled-up state, obliquely downward from the winding roller 5 to the depressing member 55 (not shown in FIG. 12), and is winded on the depressing member 55. That is, the light-shielding sheet 41 is drawn obliquely to an extension direction (i.e., the longitudinal direction) of the guide rails 22 from the winding roller 5. After being bent at the position of the depressing member 55, the light-shielding sheet 41 extends in the extension direction of the guide rails 22, and then enters the guide rails 22. At the position of the depressing member 55, the light-shielding sheet 41 is bent such that the engagement belt 43 is on the outside and that the sheet body 41a is on the inside. In the rolled-up state, a tip end part of the light-shielding sheet 41 is located near the depressing member 55. At this point, a tip end part of the sheet body 41a is winded on the depressing member 55. On the other hand, the tip end part 43a of the engagement belt 43 is not sewn to the sheet body 41a. Thus, the tip end part 43a of the engagement belt 43 extends obliquely downward as in part of the engagement belt 43 between the winding roller 5 and the depressing member 55. Accordingly, the tip end part 43a of the engagement belt 43 is separated from the sheet body 41a. The tip end part 43a of the engagement belt 43 contacts the horizontal wall 65 of the support block 6, and is located lower than the separation wall 73 of the guide piece 71.

Figure 13:
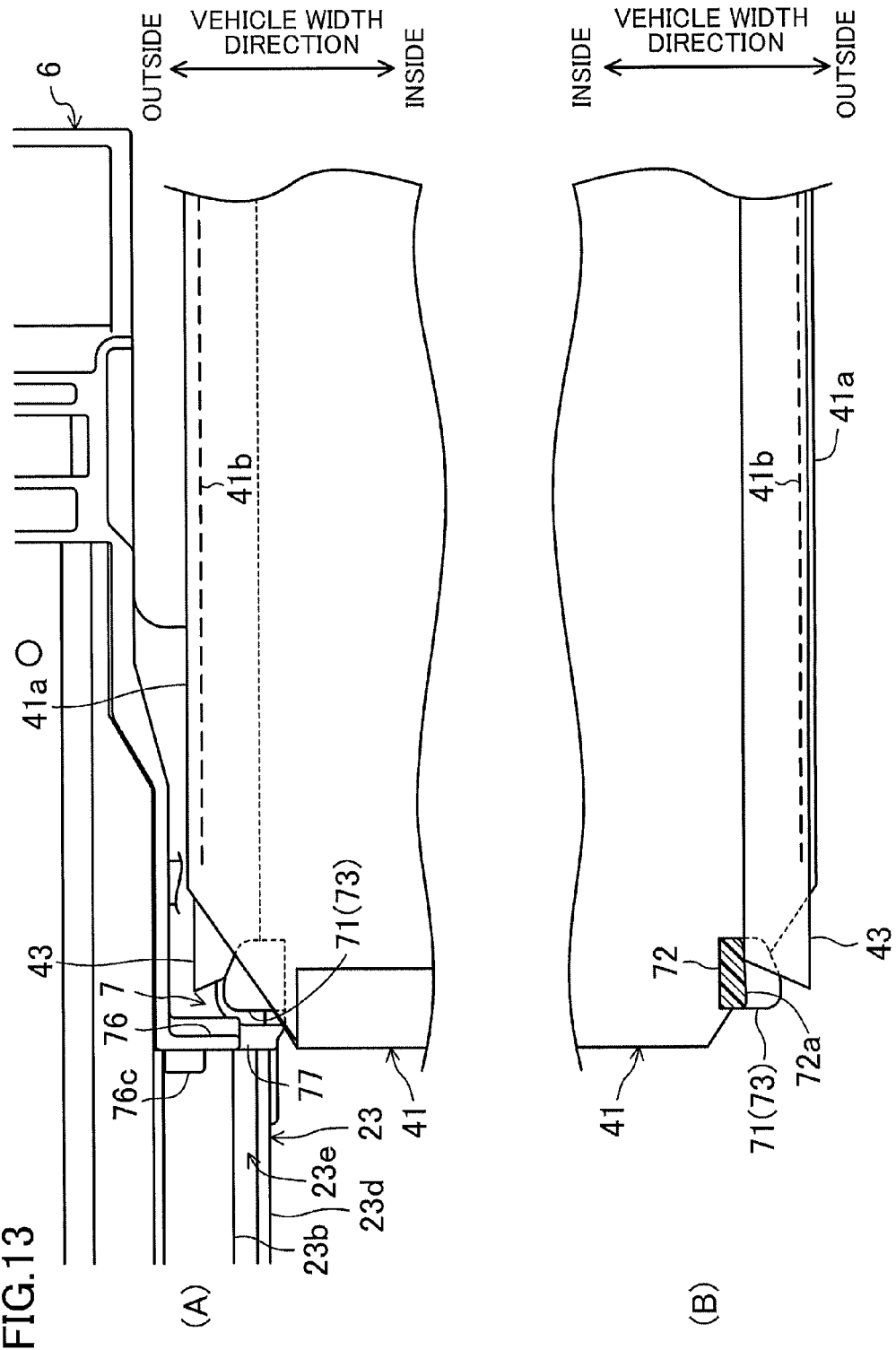

The light-shielding sheet 41 is substantially horizontally drawn from the foregoing state. Referring to FIG. 13, the sheet body 41a moves over the separation wall 73 of the guide pieces 71. On the other hand, the tip end part 43a of the engagement belt 43 enters below the separation wall 73. Thus, the separation wall 73 enters, from the forefront, between the sheet body 41a and the engagement belt 43.

The tip end part 43a of the engagement belt 43 which is a free end, i.e., which is not connected to the sheet body 41a, allows the separation wall 73 to smoothly enter between the sheet body 41a and the engagement belt 43. Moreover, the tip end part 43a of the engagement belt 43 protrudes out from the sheet body 41a toward the front. This allows the engagement belt 43 to easily engage with the guide piece 71.

Since the separation wall 73 is formed thinner toward the rear, the separation wall 73 can smoothly enter between the sheet body 41a and the engagement belt 43 moving from the rear of the separation wall 73.

When the light-shielding sheet 41 is further drawn, part of the light-shielding sheet 41 where the sheet body 41a and the engagement belt 43 are connected together at the seam 41b reaches the guide piece 71. Referring to FIG. 14, at such a part of the light-shielding sheet 41, the separation wall 73 is, from the inside in the vehicle width direction, inserted between the sheet body 41a and the engagement belt 43. This causes the inner edge part of the engagement belt 43 in the vehicle width direction to separate from the sheet body 41a.

Since the separation wall 73 is formed thinner toward the outside in the vehicle width direction, the engagement belt 43 can be farther away from the sheet body 41a on the inside in the vehicle width direction than on the outside in the vehicle width direction. In addition, an outer end part of the engagement belt 43 in the vehicle width direction is connected to the sheet body 41a, and the separation wall 73 is formed thinner toward the outside in the vehicle width direction. This allows the separation wall 73 to smoothly enter between the sheet body 41a and the engagement belt 43.

In the foregoing state, the position of the engagement belt 43 in the vehicle width direction is determined by the inner wall 72 of the guide piece 71. That is, when the engagement belt 43 is located relatively on the inside in the vehicle width direction, the engagement belt 43 contacts the inner wall 72 of the guide piece 71 as illustrated in FIGS. 13(B) and 14. The inner wall 72 guides the engagement belt 43 such that the engagement belt 43 passes on the outside of the inner wall 72 in the vehicle width direction. The outer surface 72a of the inner wall 72 is inclined so as to extend backward and inward in the vehicle width direction. Thus, while sliding against the outer surface 72a of the inner wall 72 toward the front, the engagement belt 43 is gradually guided toward the outside in the vehicle width direction. Finally, the engagement belt 43 is guided to the position on the outside of the engagement wall section 23d in the vehicle width direction in the sheet passage 23.

The ridge section 72c of the inner wall 72 on the outer rear side in the vehicle width direction defines the curved surface. Thus, when a front edge of the engagement belt 43 comes into contact with the ridge section 72c, the engagement belt 43 is smoothly guided to the outer surface 72a along the curved ridge section 72c.

The tip edge 43b of the engagement belt 43 is inclined so as to extend forward and outward in the vehicle width direction. Thus, when the tip edge 43b of the engagement belt 43 protruding toward the front comes into contact with the inner wall 72, the engagement belt 43 is guided to the outside in the vehicle width direction along the tip edge 43b.

A vehicle widthwise distance between the outer surface 72a of the inner wall 72 and the outermost part of the separation wall 73 in the vehicle width direction is shorter than a vehicle widthwise distance between an inner edge of the engagement belt 43 in the vehicle width direction and the seam 41b. Thus, the separation wall 73 can be prevented from contacting the seam 41b, and therefore damage of the seam 41b due to contact with the separation wall 73 can be reduced or prevented.

Eventually, the light-shielding sheet 41 reaches the guide wall 76, and enters the guide opening 77. In this state, the sheet body 41a is guided to the guide opening 77 by the inclined surface 76a of the guide wall 76. The sheet body 41a and the engagement belt 43 vertically separated from each other by the guide piece 71 approach each other so that the sheet body 41a and the engagement belt 43 can enter the guide opening 77 along the inclined surface 76a.

Since the opening 73a is formed below the guide piece 71 in the horizontal wall 65, the engagement belt 43 may come into contact with the edge of the opening 73a when the engagement belt 43 passes through the space below the separation wall 73. In the case where the tip edge 43b of the engagement belt 43 is formed parallel to the vehicle width direction, there is a possibility that the tip edge 43b of the engagement belt 43 is caught by the edge of the opening 73a and therefore the light-shielding sheet 41 cannot be smoothly guided to the guide rail 22. On the other hand, the tip edge 43b of the engagement belt 43 is inclined relative to the vehicle width direction. Thus, even if the tip edge 43b of the engagement belt 43 contacts the edge of the opening 73a, the engagement belt 43 moves in the vehicle width direction while moving forward. As a result, the tip edge 43b of the engagement belt 43 can be prevented from being caught by the edge of the opening 73a, and therefore the light-shielding sheet 41 can be smoothly guided to the guide rail 22. Moreover, the tip edge 43b is inclined so as to extend forward and outward in the vehicle width direction. Thus, the engagement belt 43 moves outward in the vehicle width direction when moving away from the inner wall 72 in the vehicle width direction. That is, the engagement belt 43 can be guided outward in the vehicle width direction using inclination of the tip edge 43b.

Since the guide opening 77 is smaller than the entrance port 23f of the sheet passage 23, the sheet body 41a and the engagement belt 43 having passed through the guide opening 77 smoothly enter the sheet passage 23 through the entrance port 23f.

Referring to FIG. 9, an outer part of an upper surface 73b of the separation wall 73 in the vehicle width direction is at a level lower than the upper wall section 23b of the sheet passage 23. Moreover, the upper part 77b of the opening edge 77a of the guide opening 77 is set at a level lower than the upper wall section 23b. On the other hand, an inner part of the upper surface 73b of the separation wall 73 in the vehicle width direction is at a level higher than the engagement wall section 23d of the sheet passage 23. In addition, the upper part 77b of the opening edge 77a of the guide opening 77 extends only to an outer part of the separation wall 73 in the vehicle width direction, and does not extend to an inner part of the separation wall 73 in the vehicle width direction and the engagement wall section 23d. Thus, the sheet body 41a having passed through the guide piece 71 and the guide opening 77 and having entered the sheet passage 23 is below the upper wall section 23b at the position corresponding to the upper wall section 23b, and is over the engagement wall section 23d at the position corresponding to the engagement wall section 23d.

Since rear end surfaces of the vertical wall section 23a, the upper wall section 23b, and the lower wall section 23c of the sheet passage 23 are covered by the guide wall 76, the sheet body 41a enters the sheet passage 23 without contacting a rear end surface of the guide rail 22. Note that a rear end surface of the engagement wall section 23d is not covered by the guide wall 76, and is exposed. However, part of the sheet body 41a corresponding to the engagement wall section 23d is uplifted by the separation wall 73, and therefore is less likely to contact a rear edge of the engagement wall section 23d.

A lower surface of the separation wall 73 is at a level lower than the upper end of the engagement wall section 23d. Moreover, the outer surface 72a of the inner wall 72 is positioned on the outside of the engagement wall section 23d in the vehicle width direction. Further, the lower part 77c of the opening edge 77a of the guide opening 77 is set at a level higher than the lower wall section 23c of the sheet passage 23. Thus, the engagement belt 43 having passed through the guide piece 71 and the guide opening 77 and having entered the sheet passage 23 is housed at a level lower than the upper end of the engagement wall section 23d on the outside of the engagement wall section 23d in the vehicle width direction. In this state, since the rear end surfaces of the vertical wall section 23a, the upper wall section 23b, and the lower wall section 23c of the sheet passage 23 are covered by the guide wall 76, the engagement belt 43 enters the sheet passage 23 without contacting the rear end surface of the guide rail 22.

<Conclusion>

The roll-screen device 4 is the roll-screen device provided at the movable panel 31 and the fixed panel 32 which are formed in the roof 10 of the vehicle. The roll-screen device 4 includes the winding roller 5; the light-shielding sheet 41 configured to open the movable panel 31 and the fixed panel 32 in the rolled-up state in which the light-shielding sheet 41 is rolled up on the winding roller 5 and to shield the movable panel 31 and the fixed panel 32 from light in the unrolled state in which the light-shielding sheet 41 is unrolled from the rolled-up state; the guide rails 22 provided on both sides of the light-shielding sheet 41 in the vehicle width direction and configured to guide the light-shielding sheet 41 when the light-shielding sheet 41 transitions between the rolled-up state and the unrolled state; and the guide sections 7 configured to allow entrance of the light-shielding sheet 41, which is drawn from the winding roller 5, into the guide rails 22 through the entrance ports 23f provided at the end faces of the guide rails 22. The light-shielding sheet 41 includes the sheet body 41a, and the engagement belts 43 provided at and along both side edges of the sheet body 41a in the vehicle width direction. The sheet body 41a and the engagement belts 43 are rolled up on the winding roller 5 such that the sheet body 41a and the engagement belts 43 lie on each other. The guide rails 22 include the engagement wall sections 23d located at the vehicle widthwise inner side of the engagement belts 43 and configured to engage with the engagement belts 43 to prevent the light-shielding sheet 41 from falling out of the guide rails 22. The guide sections 7 include the guide pieces 71 each configured to put distance between the engagement belt 43 and the sheet body 41a before the light-shielding sheet 41 enters the guide rails 22.

According to the foregoing configuration, the light-shielding sheet 41 is guided by the guide rails 22 when the light-shielding sheet 41 transitions between the rolled-up state and the unrolled state. In this state, since the engagement belt 43 of the light-shielding sheet 41 engages with the engagement wall section 23d of the guide rail 22, the sheet body 41a is prevented from falling out of the guide rail 22. When the light-shielding sheet 41 is rolled up on the winding roller 5, the sheet body 41a and the engagement belts 43 lie on each other. Thus, when the light-shielding sheet 41 is drawn from the winding roller 5, if the light-shielding sheet 41 enters the guide rails 22 without the state of the light-shielding sheet 41 being changed, there is a possibility that the engagement belt 43 does not properly engage with the engagement wall section 23d. More specifically, each side edge part of the light-shielding sheet 41 is guided to a corresponding one of the guide rails 22, and the remaining part of the light-shielding sheet 41 protrudes out from the guide rails 22. Thus, if the light-shielding sheet 41 enters the guide rails 22 with the sheet body 41a and the engagement belts 43 lying on each other, there is a possibility that the engagement belt 43 does not engage with the engagement wall section 23d and protrudes out from the guide rail 22. Accordingly, the light-shielding sheet 41 easily disengages from the guide rails 22, and therefore cannot be properly guided by the guide rails 22.

On the other hand, in the foregoing configuration, when the light-shielding sheet 41 is drawn from the rolled-up state, the light-shielding sheet 41 is guided by the guide sections 7, and then enters the guide rails 22 through the entrance ports 23f each formed at the end face of the guide rail 22. In this state, the guide piece 71 of the guide section 7 puts distance between the engagement belt 43 and the sheet body 41a. As a result, the sheet body 41a can move over the engagement wall section 23d with the side edge part of the sheet body 41a being inserted into the sheet passage 23, and the engagement belt 43 can be guided to the outside of the engagement wall section 23d in the vehicle width direction. As just described, when the light-shielding sheet 41 enters the guide rails 22, the engagement belt 43 of the light-shielding sheet 41 can engage with the guide rail 22, specifically the engagement wall section 23d.

Each guide section 7 is provided closer to the guide rail 22 than the guide piece 71 is, and further includes the guide wall 76 in which the guide opening 77 configured to guide the light-shielding sheet 41 is formed such that the light-shielding sheet 41 does not come into contact with the rear end surface of the guide rail 22 when the light-shielding sheet 41 enters the entrance port 23f. The guide opening 77 is smaller than the entrance port 23f.

According to the foregoing configuration, before entering the entrance port 23f, the light-shielding sheet 41 is guided by the guide opening 77 smaller than the entrance port 23f so as not to contact the rear end surface of the guide rail 22. This can prevent the light-shielding sheet 41 from being caught by the rear end surface of the guide rail 22, and can prevent the light-shielding sheet 41 from being damaged by the rear end surface of the guide rail 22.

In particular, the guide piece 71 puts distance between the sheet body 41a of the light-shielding sheet 41 and the engagement belt 43, and the light-shielding sheet 41 having passed through the guide piece 71 is guided by the guide opening 77. This can effectively prevent the light-shielding sheet 41 and the rear end surface of the guide rail 22 from contacting each other.

Each guide piece 71 includes the inner wall 72 located at the vehicle width wise inner side of the engagement belt 43, and the separation wall 73 connected to the inner wall 72 and entering between the sheet body 41a and the engagement belt 43.

According to the foregoing configuration, the separation wall 73 of the guide piece 71 puts distance between the sheet body 41a and the engagement belt 43. Moreover, since the inner wall 72 is provided in the guide piece 71, the position of the light-shielding sheet 41 in the vehicle width direction can be determined when the light-shielding sheet 41 passes through the guide piece 71.

The inner wall 72 has the outer surface 72a facing outward in the vehicle width direction, where the outer surface 72a is inclined inward in the vehicle width direction with decreasing distance to the winding roller 5.

According to the foregoing configuration, when passing through the guide piece 71, the light-shielding sheet 41 is gradually guided outward in the vehicle width direction by the inner wall 72. That is, drawing of the light-shielding sheet 41 and determination on the position of the light-shielding sheet 41 in the vehicle width direction can be smoothly performed.

The inner wall 72 has the ridge section 72c formed by the outer surface 72a facing outward in the vehicle width direction and the surface 72b facing the winding roller 5, where the ridge section 72c is a curved surface.

According to the foregoing configuration, even if a tip end of the light-shielding sheet 41 contacts the inner wall 72, the light-shielding sheet 41 can be smoothly guided to the outer surface 72a along the curved ridge section 72c.

The engagement belts 43 each have the tip edge 43b serving as the forefront in entering the guide rail 22, where the tip edge 43b is inclined such that the end of the tip edge 43b at the vehicle widthwise outer side is located forward.

According to the foregoing configuration, the tip edge 43b of the engagement belt 43 is inclined. Thus, even if the engagement belt 43 contacts another member upon forward movement of the engagement belt 43, the engagement belt 43 moves, along inclination of the tip edge 43b, in the vehicle width direction while moving forward. This can prevent the engagement belt 43 from being caught by another member. Moreover, since the tip edge 43b of the engagement belt 43 is inclined such that the end of the tip edge 43b at the vehicle widthwise outer side is located forward, the engagement belt 43 can move outward in the vehicle width direction when the tip edge 43b comes into contact with another member. Such a direction is coincident with the direction in which the engagement belt 43 is guided to engage with the engagement wall section 23d. That is, inclination of the tip edge 43b also allows the engagement belt 43 to be guided outward in the vehicle width direction.

Other Embodiment

As described above, the foregoing embodiment has been described as example techniques disclosed in the present application. However, the techniques according to the present disclosure are not limited to the foregoing embodiment, but are also applicable to those where modifications, substitutions, additions, and omissions are made. In addition, elements described in the foregoing embodiment may be combined to provide a different embodiment. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

The foregoing embodiment may have the following configurations.

In the foregoing embodiment, the movable panel 31 and the fixed panel 32 are provided as an example of the window section, but the window section is not limited to the movable panel 31 and the fixed panel 32. The window section is not necessarily openable, and may be a glass panel fixed to the opening of the roof.

The roll-screen device 4 is driven by the drive motor 13 through the push-pull cables 12, but is not limited to such a configuration. For example, the roll-screen device 4 may be manually opened/closed, or may be opened/closed by a drive source other than the drive motor.

The configuration of the light-shielding sheet 41 is not limited to the foregoing. For example, the engagement belt 43 may be formed in such a manner that the side edge part of the sheet body 41a is folded back. Moreover, the engagement belt 43 is provided below the sheet body 41a, but may be provided above the sheet body 41a. In this case, the engagement wall section 23d is provided so as to extend downward from the upper wall section 23b.

The configuration of the engagement belt 43 is not limited to the foregoing. For example, the tip end part 43a of the engagement belt 43 does not necessarily protrude out from the sheet body 41a. The tip end part 43a of the engagement belt 43 may be connected to the sheet body 41a. The tip edge 43b of the engagement belt 43 may be inclined such that the end of the tip edge 43b at the vehicle widthwise inner side is located forward. The tip edge 43b of the engagement belt 43 may be parallel to the vehicle width direction. However, the foregoing advantages can be realized by the foregoing configuration of the engagement belt 43.

The configuration of the sheet passage 23 is not limited to the foregoing. As long as the engagement wall section 23d to be engaged with the engagement belt 43 is provided in the sheet passage 23 so that the light-shielding sheet 41 can be guided, optional configuration of the sheet passage 23 can be employed.

The light-shielding sheet 41 is obliquely downwardly drawn from the winding roller 5 toward the front, and then changes the extension direction thereof to the longitudinal direction (i.e., the horizontal direction) to enter the guide rails 22. However, the light-shielding sheet 41 is not limited to such a configuration. The light-shielding sheet 41 may be obliquely upwardly drawn from the winding roller 5 toward the front, and then may change the extension direction thereof to the longitudinal direction to enter the guide rails 22. Alternatively, the light-shielding sheet 41 may be substantially horizontally drawn from the winding roller 5 to enter the guide rails 22.

The configuration of the guide section 7 is not limited to the foregoing. For example, the guide section 7 may be provided in a member other than the support block 6. Moreover, the guide section 7 does not necessarily include the guide wall 76.

INDUSTRIAL APPLICABILITY

As described above, the technique disclosed herein is useful for the roll-screen device configured to shield the window section formed in the roof of the vehicle from light.

The invention claimed is:

1. A roll-screen device provided at a window section formed in a roof of a vehicle, comprising:
a winding roller;
a light-shielding sheet configured to open the window section in a rolled-up state in which the light-shielding sheet is rolled up on the winding roller and to shield the window section from light in an unrolled state in which the light-shielding sheet is unrolled from the rolled-up state;
guide rails provided on both sides of the light-shielding sheet in a vehicle width direction and configured to guide the light-shielding sheet when the light-shielding sheet transitions between the rolled-up state and the unrolled state; and
guide sections configured to allow entrance of side edges at both sides of the light-shielding sheet, which is unrolled from the winding roller, in the vehicle width direction into the guide rails through entrance ports provided at end faces of the guide rails,
wherein the light-shielding sheet includes a sheet body, and engagement belts provided at and along side edges at both sides of the sheet body in the vehicle width direction,
the sheet body and the engagement belts are rolled up on the winding roller such that the sheet body and the engagement belts overlap each other, the guide rails include engagement wall sections located at a vehicle widthwise inner side of the engagement belts and configured to engage with the engagement belts to prevent the light-shielding sheet from falling out of the guide rails, and
the guide sections include guide pieces each configured to put distance between the engagement belt and the sheet body before the light-shielding sheet enters the guide rails.

2. The roll-screen device of claim 1, wherein each guide section is provided closer to the guide rail than the guide piece is, and further includes a guide wall in which a guide opening configured to guide the light-shielding sheet is formed such that the light-shielding sheet does not come into contact with the end face of the guide rail when the light-shielding sheet enters the entrance port, and the guide opening is smaller than the entrance port.

3. The roll-screen device of claim 1, wherein each guide piece includes an inner wall located at the vehicle widthwise inner side of the engagement belt, and a separation wall connected to the inner wall and located between the sheet body and the engagement belt.

4. A roll-screen device provided at a window section formed in a roof of a vehicle, comprising:
a winding roller;
a light-shielding sheet configured to open the window section in a rolled-up state in which the light-shielding sheet is rolled up on the winding roller and to shield the window section from light in an unrolled state in which the light-shielding sheet is unrolled from the rolled-up state; guide rails provided on both sides of the light-shielding sheet in a vehicle width direction and configured to guide the light-shielding sheet when the light-shielding sheet transitions between the rolled-up state and the unrolled state;
and guide sections configured to allow entrance of side edges at both sides of the light-shielding sheet, which is unrolled from the winding roller, in the vehicle width direction into the guide rails through entrance ports provided at end faces of the guide rails,
wherein the light-shielding sheet includes a sheet body, and engagement belts provided at and along side edges at both sides of the sheet body in the vehicle width direction,
the sheet body and the engagement belts are rolled up on the winding roller such that the sheet body and the engagement belts overlap each other, the guide rails include engagement wall sections located at a vehicle widthwise inner side of the engagement belts and configured to engage with the engagement belts to prevent the light-shielding sheet from falling out of the guide rails, and
the guide sections include guide pieces each configured to put distance between the engagement belt and the sheet body before the light-shielding sheet enters the guide rails;
wherein each guide piece includes an inner wall located at the vehicle widthwise inner side of the engagement belt, and a separation wall connected to the inner wall and located between the sheet body and the engagement belt; and
wherein the inner wall has a surface facing outward in the vehicle width direction, where the surface is inclined inward in the vehicle width direction with decreasing distance to the winding roller.

5. A roll-screen device provided at a window section formed in a roof of a vehicle, comprising:
a winding roller;
a light-shielding sheet configured to open the window section in a rolled-up state in which the light-shielding sheet is rolled up on the winding roller and to shield the window section from light in an unrolled state in which the light-shielding sheet is unrolled from the rolled-up state; guide rails provided on both sides of the light-shielding sheet in a vehicle width direction and configured to guide the light-shielding sheet when the light-shielding sheet transitions between the rolled-up state and the unrolled state;
and guide sections configured to allow entrance of side edges at both sides of the light-shielding sheet, which is unrolled from the winding roller, in the vehicle width direction into the guide rails through entrance ports provided at end faces of the guide rails,
wherein
the light-shielding sheet includes a sheet body, and engagement belts provided at and along side edges at both sides of the sheet body in the vehicle width direction,
the sheet body and the engagement belts are rolled up on the winding roller such that the sheet body and the engagement belts overlap each other, the guide rails include engagement wall sections located at a vehicle widthwise inner side of the engagement belts and configured to engage with the engagement belts to prevent the light-shielding sheet from falling out of the guide rails, and
the guide sections include guide pieces each configured to put distance between the engagement belt and the sheet body before the light-shielding sheet enters the guide rails;
wherein each guide piece includes an inner wall located at the vehicle widthwise inner side of the engagement belt, and a separation wall connected to the inner wall and located between the sheet body and the engagement belt; and
wherein the inner wall has a ridge section formed by a surface facing outward in the vehicle width direction and a surface facing the winding roller, where the ridge section is a curved surface.

6. The roll-screen device of claim 1, wherein the engagement belts each have a tip edge serving as a forefront in entering the guide rail, where the tip edge is inclined such that an end of the tip edge at a vehicle widthwise outer side is located forward.

* * * * *